(12) United States Patent
Tomiyama et al.

(10) Patent No.: US 10,626,949 B2
(45) Date of Patent: Apr. 21, 2020

(54) TORQUE FLUCTUATION INHIBITING DEVICE, TORQUE CONVERTER AND POWER TRANSMISSION DEVICE

(71) Applicant: EXEDY Corporation, Neyagawa-shi, Osaka (JP)

(72) Inventors: Naoki Tomiyama, Neyagawa (JP); Yoshiyuki Hagihara, Neyagawa (JP); Koichi Higuchi, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 247 days.

(21) Appl. No.: 15/576,776

(22) PCT Filed: Jul. 22, 2016

(86) PCT No.: PCT/JP2016/071503
§ 371 (c)(1),
(2) Date: Nov. 24, 2017

(87) PCT Pub. No.: WO2017/029939
PCT Pub. Date: Feb. 23, 2017

(65) Prior Publication Data
US 2018/0163815 A1    Jun. 14, 2018

(30) Foreign Application Priority Data

Aug. 20, 2015  (JP) ................................. 2015-162957
Oct. 6, 2015   (JP) ................................. 2015-198244
(Continued)

(51) Int. Cl.
*F16H 45/02*    (2006.01)
*F16F 15/134*   (2006.01)
(Continued)

(52) U.S. Cl.
CPC ...... *F16F 15/13469* (2013.01); *F16F 15/123* (2013.01); *F16F 15/13128* (2013.01);
(Continued)

(58) Field of Classification Search
CPC .......... F16H 25/18; F16H 41/24; F16H 45/02; F16F 15/1457; F16F 15/123; F16F 15/31;
(Continued)

(56) References Cited

U.S. PATENT DOCUMENTS 1,929,206 A    10/1933  Meyer
2,079,226 A *  5/1937   Sarazin ................... F16F 15/14
                                                    74/574.3
(Continued)

FOREIGN PATENT DOCUMENTS

CN    1818415 A    8/2006
CN    1906431 A    1/2007
(Continued)

OTHER PUBLICATIONS

International Search Report dated Aug. 30, 2016 for foreign Application No. PCT/JP2016/071332, 1 pp.
(Continued)

*Primary Examiner* — Abiy Teka
(74) *Attorney, Agent, or Firm* — United IP Counselors, LLC

(57) ABSTRACT

A torque fluctuation inhibiting device includes a mass body, first and second centrifugal elements, and first and second cam mechanisms. The mass body is rotatable with a rotor and is also rotatable relatively to the rotor. Each of the first and second centrifugal elements receives a centrifugal force to be generated by rotation of the rotor and the mass body. When a relative displacement is produced between the rotor and the mass body in a rotational direction, the first cam mechanism converts the centrifugal force that acts on the
(Continued)

first centrifugal element into a first circumferential force directed to reduce the relative displacement. When the relative displacement is produced between the rotor and the mass body in the rotational direction, the second cam mechanism converts the centrifugal force that acts on the second centrifugal element into a second circumferential force directed to reduce the relative displacement.

6 Claims, 20 Drawing Sheets

(30) Foreign Application Priority Data

Oct. 7, 2015 (JP) .................................. 2015-199308
Oct. 23, 2015 (JP) .................................. 2015-208759

(51) Int. Cl.
```
F16H 41/24      (2006.01)
F16F 15/131     (2006.01)
F16F 15/31      (2006.01)
F16F 15/14      (2006.01)
F16F 15/123     (2006.01)
F16H 25/18      (2006.01)
```

(52) U.S. Cl.
CPC ........ *F16F 15/145* (2013.01); *F16F 15/1457* (2013.01); *F16F 15/31* (2013.01); *F16H 25/18* (2013.01); *F16H 41/24* (2013.01); *F16H 45/02* (2013.01); *F16F 15/134* (2013.01); *F16H 2045/0205* (2013.01); *F16H 2045/0221* (2013.01); *F16H 2045/0231* (2013.01); *F16H 2045/0263* (2013.01); *Y10T 74/2121* (2015.01); *Y10T 74/2128* (2015.01)

(58) Field of Classification Search
CPC .... F16F 15/14; F16F 15/13128; F16F 15/145; F16F 15/13469
See application file for complete search history.

(56) References Cited

U.S. PATENT DOCUMENTS

| | | | |
|---|---|---|---|
| 3,578,822 | A | 5/1971 | Slemmons |
| 3,730,013 | A | 5/1973 | Slemmons |
| 5,180,334 | A | 1/1993 | Nakane et al. |
| 5,976,020 | A | 11/1999 | Lohaus et al. |
| 6,044,942 | A | 4/2000 | Fukushima |
| 10,184,542 | B2 | 1/2019 | Tomiyama et al. |
| 2003/0037636 | A1 | 2/2003 | Kawata et al. |
| 2010/0269497 | A1 | 10/2010 | Engelmann et al. |
| 2014/0144284 | A1 | 5/2014 | Lee |
| 2014/0182415 | A1 | 7/2014 | Griesmeier et al. |
| 2015/0075320 | A1 | 3/2015 | Verhoog |
| 2015/0167779 | A1 | 6/2015 | Ulbrich et al. |
| 2016/0153521 | A1 | 6/2016 | Tondellier |
| 2016/0318399 | A1 | 11/2016 | Paweletz |
| 2016/0333961 | A1 | 11/2016 | Dinger |
| 2018/0187745 | A1 | 7/2018 | Tomiyama et al. |
| 2018/0306272 | A1 | 10/2018 | Tomiyama et al. |

FOREIGN PATENT DOCUMENTS

| | | |
|---|---|---|
| CN | 101223381 A | 7/2008 |
| CN | 202811884 U | 3/2013 |
| CN | 103438153 A | 12/2013 |
| CN | 10389707 A | 7/2014 |
| CN | 103917800 A | 7/2014 |
| CN | 104471279 A | 3/2015 |
| DE | 19841418 A1 | 3/1999 |
| DE | 19954273 A1 | 5/2001 |
| DE | 102014204947 A | 10/2014 |
| DE | 102014224164 A1 | 7/2015 |
| FR | 2768479 A1 | 3/1999 |
| JP | H01-312246 A | 12/1989 |
| JP | H1182628 A | 3/1999 |
| JP | 2003-004101 A | 1/2003 |
| JP | 2003-065392 A | 3/2003 |
| JP | 2014-047805 A | 3/2014 |
| JP | 2014-152834 A | 8/2014 |
| JP | 2014-152835 A | 8/2014 |
| JP | 2014145413 A | 8/2014 |
| JP | 2015-014355 A | 1/2015 |
| JP | 2015094424 A | 5/2015 |
| JP | 2015-143558 A | 8/2015 |
| WO | 2012/043677 A1 | 4/2012 |

OTHER PUBLICATIONS

International Search Report dated Aug. 30, 2016 for corresponding foreign Application No. PCT/JP2016/071503, 1 pp.
International Search Report dated Aug. 30, 2016 for foreign Application No. PCT/JP2016/071333, 1 pp.
International Search Report dated Aug. 30, 2016 for foreign Application No. PCT/JP2016/071504, 1 pp.
Office Action of the Japanese Application No. 2015-162957, dated Feb. 26, 2019, pp. 6.
U.S. Appl. No. 15/576,755, filed Nov. 24, 2017, Exedy Corporation.
U.S. Appl. No. 15/576,784, filed Nov. 24, 2017, Exedy Corporation.
U.S. Appl. No. 15/576,788, filed Nov. 24, 2017, Exedy Corporation.
First Office Action of the corresponding Chinese patent application No. 201680047359.1, dated Jan. 28, 2019, 5 pp.
Notice of Allowance of the related U.S. Appl. No. 15/576,784, dated Oct. 4, 2018, 8 pp.
Requirement for Restriction/Election of the related U.S. Appl. No. 15/576,755, dated Apr. 12, 2019, 6 pp.
Notification of Reasons for Refusal for the Japanese patent application No. 2015-208759, dated Apr. 16, 2019, 7 pp.
First Office Action of the Chinese patent application No. 201680046952.4, dated Apr. 12, 2019, 6 pp.
Office Action of the corresponding Japanese Application No. 2015-198244, dated Jul. 23, 2019, pp. 4.
Non-Final Office Action of the related U.S. Appl. No. 15/576,788, dated Dec. 4, 2019, 11 pp.
Non-Final Office Action of the U.S. Appl. No. 15/576,755, dated Jun. 25, 2019, pp. 44.

\* cited by examiner

TORQUE FLUCTUATION INHIBITING DEVICE, TORQUE CONVERTER AND POWER TRANSMISSION DEVICE

CROSS-REFERENCES TO RELATED APPLICATIONS

This application is the U.S. National Phase of PCT International Application No. PCT/JP2016/071503 filed on Jul. 22, 2016. That application claims priority to Japanese Patent Application No. 2015-162957, filed on Aug. 20, 2015, Japanese Patent Application No. 2015-198244, filed on Oct. 6, 2015, Japanese Patent Application No. 2015-199308, filed on Oct. 7, 2015, and Japanese Patent Application No. 2015-208759, filed on Oct. 23, 2015. The contents of all five applications are herein incorporated by reference in their entirety.

BACKGROUND

Technical Field

The present disclosure relates to a torque fluctuation inhibiting device, particularly to a torque fluctuation inhibiting device for inhibiting torque fluctuations in a rotor to which a torque is inputted. Additionally, the present disclosure relates to a torque converter and a power transmission device, each of which includes the torque fluctuation inhibiting device.

Background Art

For example, a clutch device, including a damper device, and a torque converter are provided between an engine and a transmission in an automobile. Additionally, for reduction in fuel consumption, the torque converter is provided with a lock-up device that mechanically transmits a torque at a predetermined rotational speed or greater.

The lock-up device generally includes a clutch part and a damper including a plurality of torsion springs. Additionally, the clutch part includes a piston to which a friction member is attached and that is pressed onto a front cover by an action of hydraulic pressure. Then in a lock-up on state, a torque is transmitted from the front cover to the piston through the friction member, and is further transmitted therefrom to an output-side member through the plural torsion springs.

In the lock-up device described above, torque fluctuations (fluctuations in rotational velocity) are inhibited by the damper including the plural torsion springs.

Incidentally, a lock-up device described in Japan Laid-open Patent Application Publication No. 2015-094424 is provided with a dynamic damper device including an inertia member in order to inhibit torque fluctuations. The dynamic damper device described in Japan Laid-open Patent Application Publication No. 2015-094424 is attached to a plate supporting torsion springs, and includes a pair of inertia rings, which is rotatable relatively to the plate, and a plurality of coil springs disposed between the plate and the inertia rings.

BRIEF SUMMARY

A peak of torque fluctuations, occurring in a predetermined rotational speed range, can be reduced by providing the lock-up device with the dynamic damper device in Japan Laid-open Patent Application Publication No. 2015-094424.

Well-known dynamic damper devices including that of Japan Laid-open Patent Application Publication No. 2015-094424 can reduce a peak of torque fluctuations in a predetermined rotational speed range. However, when the specification of the engine or so forth is changed, a rotational speed range in which a peak of torque fluctuations appears varies in accordance therewith. Therefore, the inertia amount of the inertia rings and the spring constant of the coil springs are required to be changed in accordance with changing the specification of the engine or so forth. However, coping with such requirement may be difficult in some cases.

It is an object of the present disclosure to make it possible, in a device for inhibiting torque fluctuations in a rotary member, to reduce a peak of torque fluctuations in a relatively wide rotational speed range.

Solution to Problems (1) A torque fluctuation inhibiting device according to the present disclosure is a device for inhibiting torque fluctuations in a rotor to which a torque is inputted. The torque fluctuation inhibiting device includes a mass body, first and second centrifugal elements, a first cam mechanism and a second cam mechanism. The mass body is disposed to be rotatable with the rotor and be rotatable relatively to the rotor. Each of the first and second centrifugal elements is disposed to receive a centrifugal force to be generated by rotation of the rotor and the mass body. When a relative displacement is produced between the rotor and the mass body in a rotational direction, the first cam mechanism converts the centrifugal force acting on the first centrifugal element into a first circumferential force directed to reduce the relative displacement. When the relative displacement is produced between the rotor and the mass body in the rotational direction, the second cam mechanism converts the centrifugal force acting on the second centrifugal element into a second circumferential force directed to reduce the relative displacement.

When a torque is inputted to the rotor in this device, the rotor and the mass body are rotated. When the torque inputted to the rotor does not fluctuate, relative displacement is not produced between the rotor and the mass body in the rotational direction. Therefore, the rotor and the mass body are rotated in synchronization with each other. On the other hand, when the torque inputted to the rotor fluctuates, the relative displacement is produced between the mass body and the rotor in the rotational direction (the displacement will be hereinafter expressed as "rotational phase difference" on an as-needed basis) depending on the extent of torque fluctuations, because the mass body is disposed to be rotatable relatively to the rotor.

When the rotor and the mass body are herein rotated, the first and second centrifugal elements receive centrifugal forces. Then, when the relative displacement is produced between the rotor and the mass body, the first and second cam mechanisms are actuated to convert the centrifugal forces acting on the first and second centrifugal elements into first and second circumferential forces, respectively, which are different from each other, so as to reduce the relative displacement between the rotor and the mass body by the circumferential forces. Torque fluctuations are inhibited by the herein described actuations of the first and second cam mechanisms.

Here, the centrifugal forces acting on the first and second centrifugal elements are utilized for inhibiting torque fluctuations. Hence, characteristics of inhibiting torque fluctuations are configured to vary in accordance with the rotational speed of the rotor. Moreover, the characteristics of inhibiting torque fluctuations can be appropriately set even for an engine that performs cylinder deactivation, for instance, by suitably setting the characteristics of the first and second cam mechanisms. Hence, a peak of torque fluctuations can be reduced in as wide a rotational speed range as possible.

(2) Preferably, the rotor includes a first rotor disposed in a first axial position and a second rotor disposed in a second axial position. Additionally, the mass body includes a first inertia ring disposed on an outer or inner periphery of the first rotor and a second inertia ring disposed on an outer or inner periphery of the second rotor. Moreover, the first centrifugal element is supported by the first rotor or the first inertia ring so as to be movable in a radial direction, and the second centrifugal element is supported by the second rotor or the second inertia ring so as to be movable in the radial direction. Furthermore, the first cam mechanism is disposed in the first axial position in an axial direction, and the second cam mechanism is disposed in the second axial position in the axial direction.

Here, the first inertia ring and the second inertia ring, which compose the mass body, are disposed on the outer or inner periphery of the first rotor and that of the second rotor, respectively. Hence, the axial space of the device can be reduced.

(3) Preferably, the first centrifugal element is disposed in a first circumferential position in the rotor or the mass body, and the second centrifugal element is disposed in a second circumferential position in the rotor or the mass body. Additionally, the first cam mechanism is disposed in the first circumferential position, and the second cam mechanism is disposed in the second circumferential position.

Here, the first centrifugal element and the second centrifugal element are disposed in different circumferential positions. Hence, both centrifugal elements can be disposed on the circumference of the same imaginary circle, whereby the radial space of the device can be reduced. Likewise, this is also true of the first cam mechanism and the second cam mechanism.

(4) Preferably, the mass body includes a first inertia ring disposed on an outer periphery of the rotor and a second inertia ring disposed on a further outer periphery of the first inertia ring. Additionally, the first centrifugal element is supported by the rotor so as to be movable in a radial direction, and the second centrifugal element is supported by the first inertia ring so as to be movable in the radial direction. Moreover, the first cam mechanism is disposed on the outer periphery of the rotor while being disposed on an inner periphery of the first inertia ring. The second cam mechanism is disposed on the outer periphery of the first inertia ring while being disposed on an inner periphery of the second inertia ring.

Here, the first inertia ring is disposed on the outer periphery of the rotor, and the second inertia ring is disposed on the further outer periphery of the first inertia ring. Hence, the first and second inertia rings can be disposed in the same position in the axial direction. Therefore, the axial dimension of the device can be shortened. This is also true of the first cam mechanism and the second cam mechanism.

(5) Preferably, the second cam mechanism includes an actuation preventing mechanism that restricts the second centrifugal element from moving outward in the radial direction when the rotor or the mass body is rotated at a predetermined speed or greater, and prevents the centrifugal force acting on the second centrifugal element from being converted into the circumferential force by actuation of the actuation preventing mechanism.

(6) Preferably, the rotor includes at least one recess on an outer peripheral surface thereof, and at least one of the first and second centrifugal elements is accommodated in the at least one recess so as to be movable in the radial direction.

In this case, the at least one centrifugal element is accommodated in the at least one recess of the rotor. Hence, the axial dimension of the device can be suppressed.

(7) Preferably, a friction coefficient between the at least one recess and the at least one of the first and second centrifugal elements accommodated in the at least one recess is less than or equal to 0.1.

(8) Preferably, a friction reducing member is disposed between the at least one recess and a lateral surface of the at least one centrifugal element accommodated in the at least one recess so as to reduce friction occurring in movement of the at least one centrifugal element, and the lateral surface is disposed along the moving direction of the at least one centrifugal element.

(9) Preferably, each of the first and second cam mechanisms includes a cam follower and a cam. The cam follower is provided on each of the first and second centrifugal elements. The cam, with which the cam follower makes contact, is provided on an inner peripheral surface of the rotor or the mass body disposed on an outer peripheral side, and has a shape making each of the circumferential forces vary in accordance with an amount of the relative displacement between the rotor and the mass body in the rotational direction.

Here, the amount of the relative displacement between the rotor and the mass body in the rotational direction fluctuates in accordance with the magnitude of torque fluctuations in the rotor. At this time, the shape of the cam is set such that the circumferential force, into which the centrifugal force is converted, varies in accordance with the amount of the relative displacement. Hence, torque fluctuations can be inhibited as efficiently as possible.

(10) Preferably, the torque fluctuation inhibiting device further includes at least one urging member. The at least one urging member is disposed inside the at least one recess, and urges at least one of the first and second centrifugal elements outward in the radial direction such that at least one corresponding pair of the cam and the cam follower makes contact with each other while the rotor and the mass body are not being rotated.

Here, a given cam follower is caused to constantly make contact with its corresponding cam when provided on the centrifugal element urged radially outward by the urging member. Therefore, it is possible to eliminate sound to be produced when the cam follower is separated from the cam in stop of rotation or when the cam follower makes contact (collides) with the cam in start of rotation.

(11) Preferably, the mass body has a continuous annular shape.

(12) A torque converter according to the present disclosure is disposed between an engine and a transmission. The torque converter includes an input-side rotor to which a torque is inputted from the engine, an output-side rotor outputting the torque to the transmission, a damper disposed between the input-side rotor and the output-side rotor, and the torque fluctuation inhibiting device configured as any of the above.

(13) Preferably, the torque fluctuation inhibiting device is disposed on the input-side rotor.

(14) Preferably, the torque fluctuation inhibiting device is disposed on the output-side rotor.

(15) Preferably, the damper includes a first damper to which the torque is inputted from the input-side rotor, a second damper outputting the torque to the output-side rotor, and an intermediate member provided between the first damper and the second damper. Additionally, the torque fluctuation inhibiting device is disposed on the intermediate member.

(16) Preferably, the damper includes a plurality of coil springs. Preferably, the torque converter further includes a float member that is rotatable relatively to the input-side rotor and the output-side rotor and supports the plurality of coil springs, and the torque fluctuation inhibiting device is disposed on the float member.

(17) A power transmission device according to the present disclosure includes a flywheel, a clutch device and the torque fluctuation inhibiting device configured as any of the above. The flywheel includes a first inertia body rotated about a rotational axis, a second inertia body, which is rotated about the rotational axis and is rotatable relatively to the first inertia body, and a damper disposed between the first inertia body and the second inertia body. The clutch device is provided on the second inertia body of the flywheel.

(18) Preferably, the torque fluctuation inhibiting device is disposed on the second inertia body.

(19) Preferably, the torque fluctuation inhibiting device is disposed on the first inertia body.

(20) Preferably, the damper includes a first damper to which a torque is inputted from the first inertia body, a second damper outputting the torque to the second inertia body, and an intermediate member provided between the first damper and the second damper. Additionally, the torque fluctuation inhibiting device is disposed on the intermediate member.

According to the present advancement described above, in a device for inhibiting torque fluctuations in a rotary member, a peak of torque fluctuations can be reduced in a relatively wide rotational speed range.

DETAILED DESCRIPTION OF EMBODIMENTS

Figure 1:
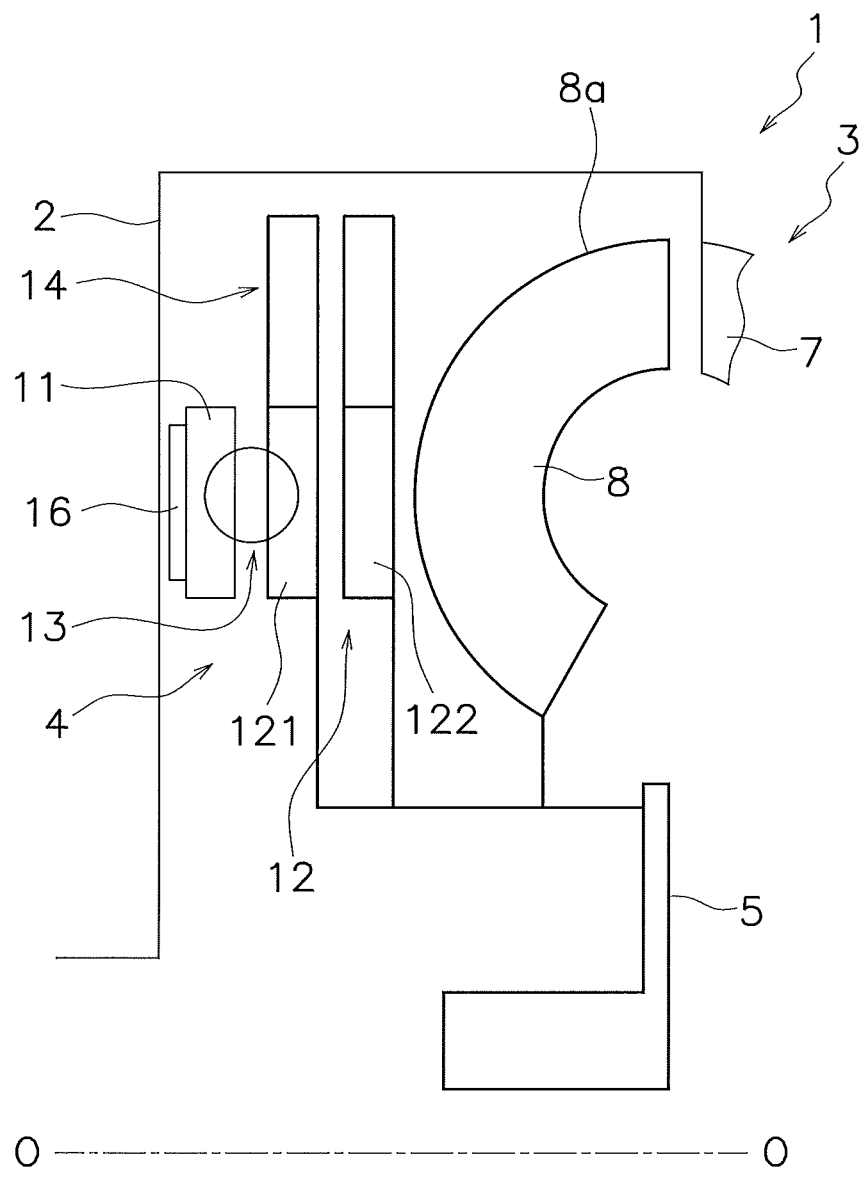
FIG. 1 is a schematic diagram of a torque converter according to an exemplary embodiment of the present disclosure.

FIG. 1 is a schematic diagram of a condition that a torque fluctuation inhibiting device according to an exemplary embodiment of the present disclosure is attached to a lock-up device for a torque converter. In FIG. 1, line O-O indicates a rotational axis of the torque converter.

[Entire Configuration]

A torque converter 1 includes a front cover 2, a torque converter body 3, a lock-up device 4 and an output hub 5. A torque is inputted to the front cover 2 from an engine. The torque converter body 3 includes an impeller 7 coupled to the front cover 2, a turbine 8 and a stator (not shown in the drawings). The turbine 8 is coupled to the output hub 5, and an input shaft of a transmission (not shown in the drawings) is capable of being spline-coupled to the inner peripheral part of the output hub 5.

[Lock-Up Device 4]

The lock-up device 4 includes a clutch part, a piston to be actuated by hydraulic pressure, and so forth, and is settable to a lock-up on state and a lock-up off state. In the lock-up on state, the torque inputted to the front cover 2 is transmitted to the output hub 5 through the lock-up device 4 without through the torque converter body 3. On the other hand, in the lock-up off state, the torque inputted to the front cover 2 is transmitted to the output hub 5 through the torque converter body 3.

The lock-up device 4 includes an input-side rotor 11, an output-side rotor 12, a damper 13 and a torque fluctuation inhibiting device 14.

The input-side rotor 11 includes an axially movable piston, and is provided with a friction member 16 on the front cover 2-side lateral surface thereof. When the friction member 16 is pressed onto the front cover 2, the torque is transmitted from the front cover 2 to the input-side rotor 11.

The output-side rotor 12 includes a first hub 121 (a first rotor) and a second hub 122 (a second rotor) that are disposed in axial opposition to each other. The first hub 121 is disposed in axial opposition to the input-side rotor 11, and is rotatable relative to the input-side rotor 11. Additionally, the first hub 121 and the second hub 122 are rotated in synchronization with each other while being fixed to each other, and both of them are coupled to the output hub 5.

The damper 13 is disposed between the input-side rotor 11 and the first hub 121. The damper 13 includes a plurality of torsion springs and elastically couples the input-side rotor 11 and the first hub 121 in a rotational direction. The damper 13 transmits the torque from the input-side rotor 11 to the first and second hubs 121 and 122, and also, absorbs and attenuates torque fluctuations.

[Torque Fluctuation Inhibiting Device 14]

First Exemplary Embodiment

Figure 2A:
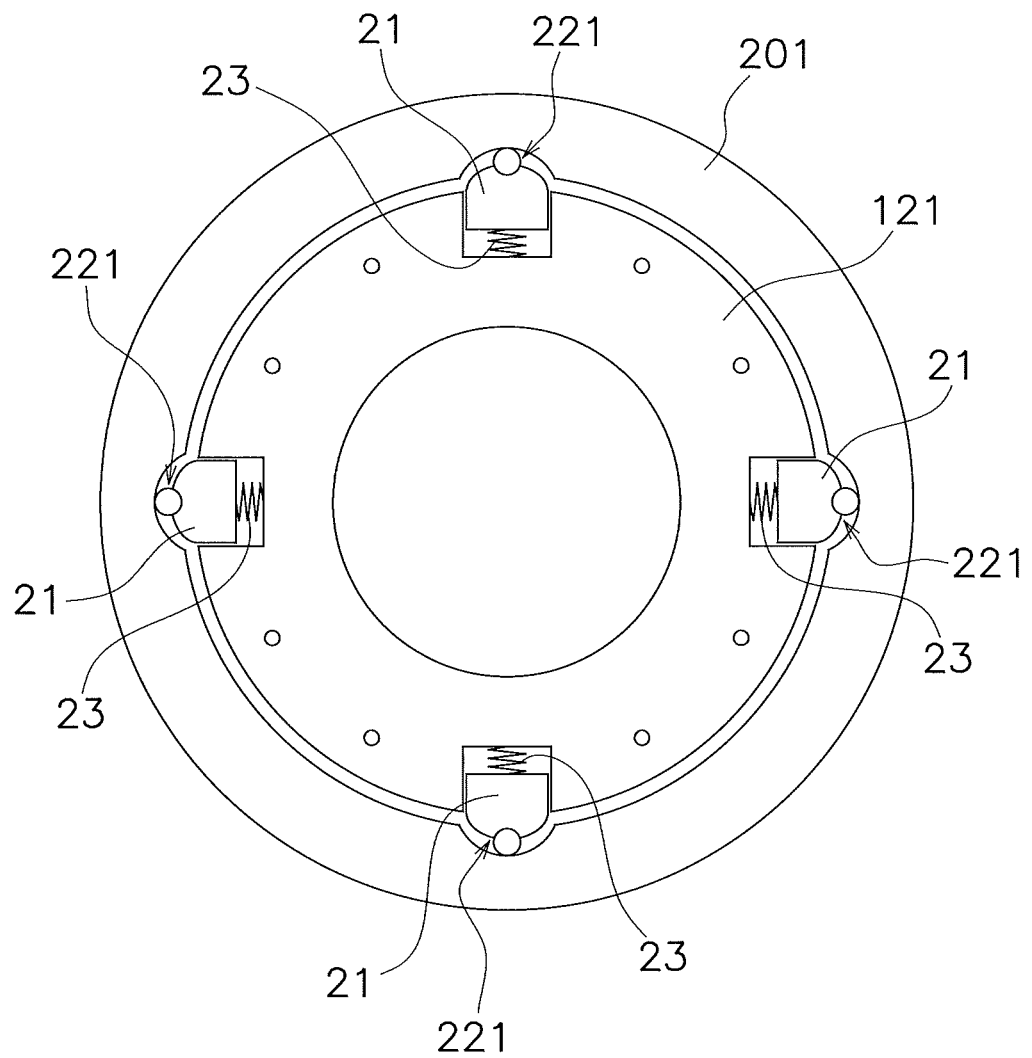
FIG. 2A is a front view of a first hub and a torque fluctuation inhibiting device that are shown in FIG. 1.
Figure 3A:
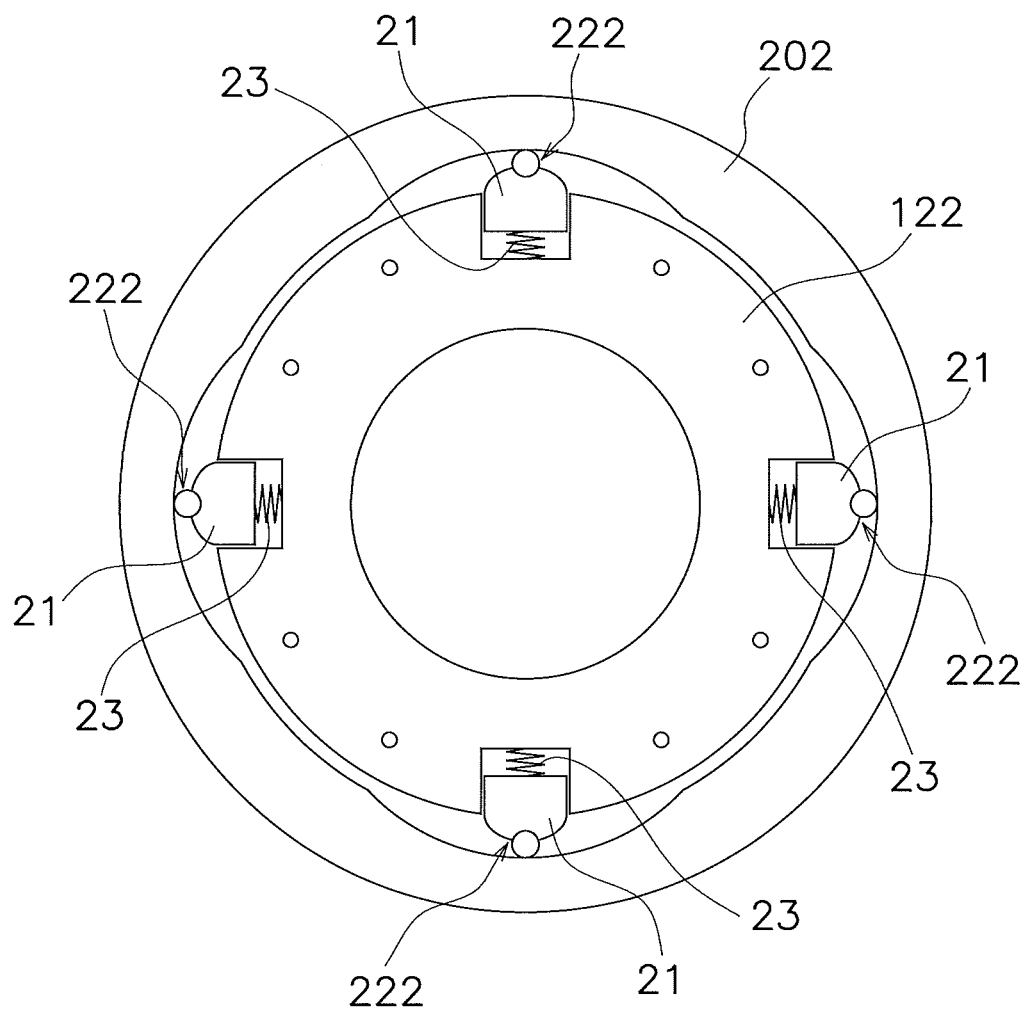
FIG. 3A is a front view of a second hub and the torque fluctuation inhibiting device that are shown in FIG. 1.

FIG. 2A is a front view of the first hub 121 and the torque fluctuation inhibiting device 14, whereas FIG. 3A is a front view of the second hub 122 and the torque fluctuation inhibiting device 14. Additionally, part of FIG. 2A is shown close-up in FIG. 4. As shown in these drawings, the torque fluctuation inhibiting device 14 includes first and second inertia rings 201 and 202 composing a mass body 20, a plurality of centrifugal elements 21, four first cam mechanisms 221, four second cam mechanisms 222 and a plurality of coil springs 23. The centrifugal elements 21, the first and second cam mechanisms 221 and 222, and the coil springs 23 are disposed at equal angular intervals of 90 degrees in the circumferential direction, respectively.

Figure 2B:
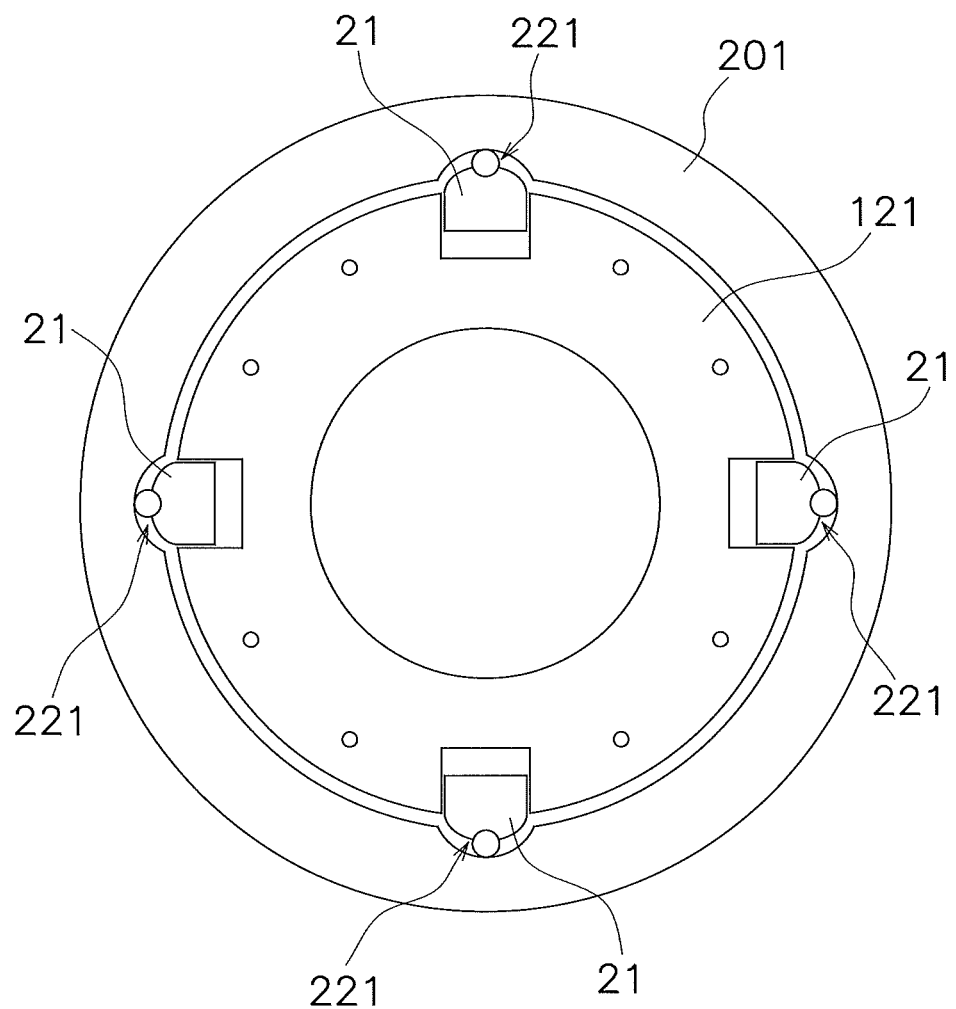
FIG. 2B is a diagram according to another exemplary embodiment and corresponds to FIG. 2A.
Figure 3B:
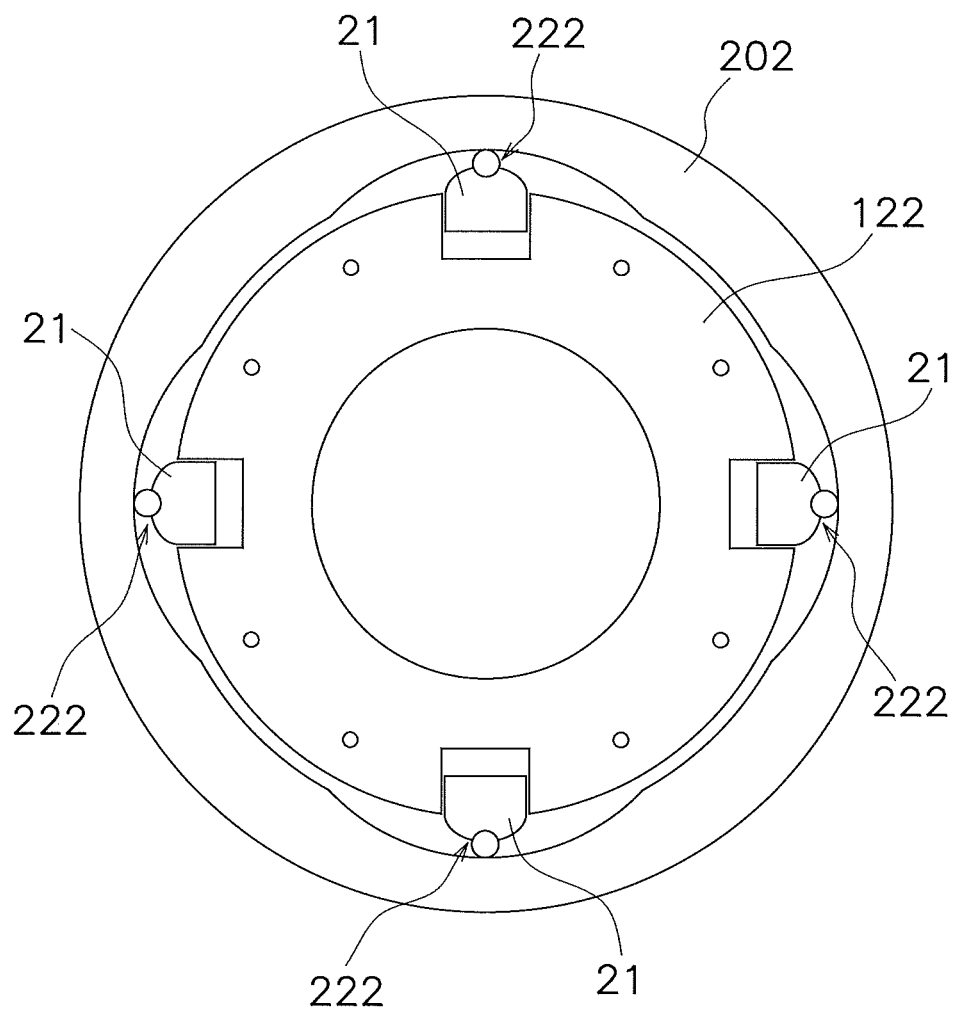
FIG. 3B is a diagram according to the another exemplary embodiment and corresponds to FIG. 3A.

It should be noted that alternatively, the coil springs 23, disposed on the inner peripheral side of the centrifugal elements 21, respectively, can be omitted as shown in FIGS. 2B and 3B. Likewise, the coil springs 23 can be provided or omitted in respective examples to be hereinafter explained.

The first inertia ring 201 is a continuous annular plate with a predetermined thickness, and is disposed on the outer peripheral side of the first hub 121 such that a predetermined gap is produced radially between the first inertia ring 201 and the first hub 121. In other words, the first inertia ring 201 is disposed axially in the same position as the first hub 121. Additionally, the first inertia ring 201 has a rotational axis, which is the same as that of the first hub 121. The first inertia ring 201 is rotatable with the first hub 121, and is also rotatable relatively thereto.

The second inertia ring 202 has a similar configuration to the first inertia ring 201. Specifically, the second inertia ring 202 has a continuous annular shape and is disposed on the outer peripheral side of the second hub 122 such that a predetermined gap is produced radially between the second inertia ring 202 and the second hub 122. The second inertia ring 202 is disposed axially in the same position as the second hub 122. Additionally, the second inertia ring 202 has a rotational axis, which is the same as that of the second hub 122. The second inertia ring 202 is rotatable with the second hub 122, and is also rotatable relatively thereto.

The centrifugal elements 21 are disposed in the first hub 121 and the second hub 122, and are radially movable by centrifugal forces to be generated by rotation of the first hub 121 and the second hub 122. The centrifugal elements provided in the first hub 121 will be hereinafter explained.

Figure 4:
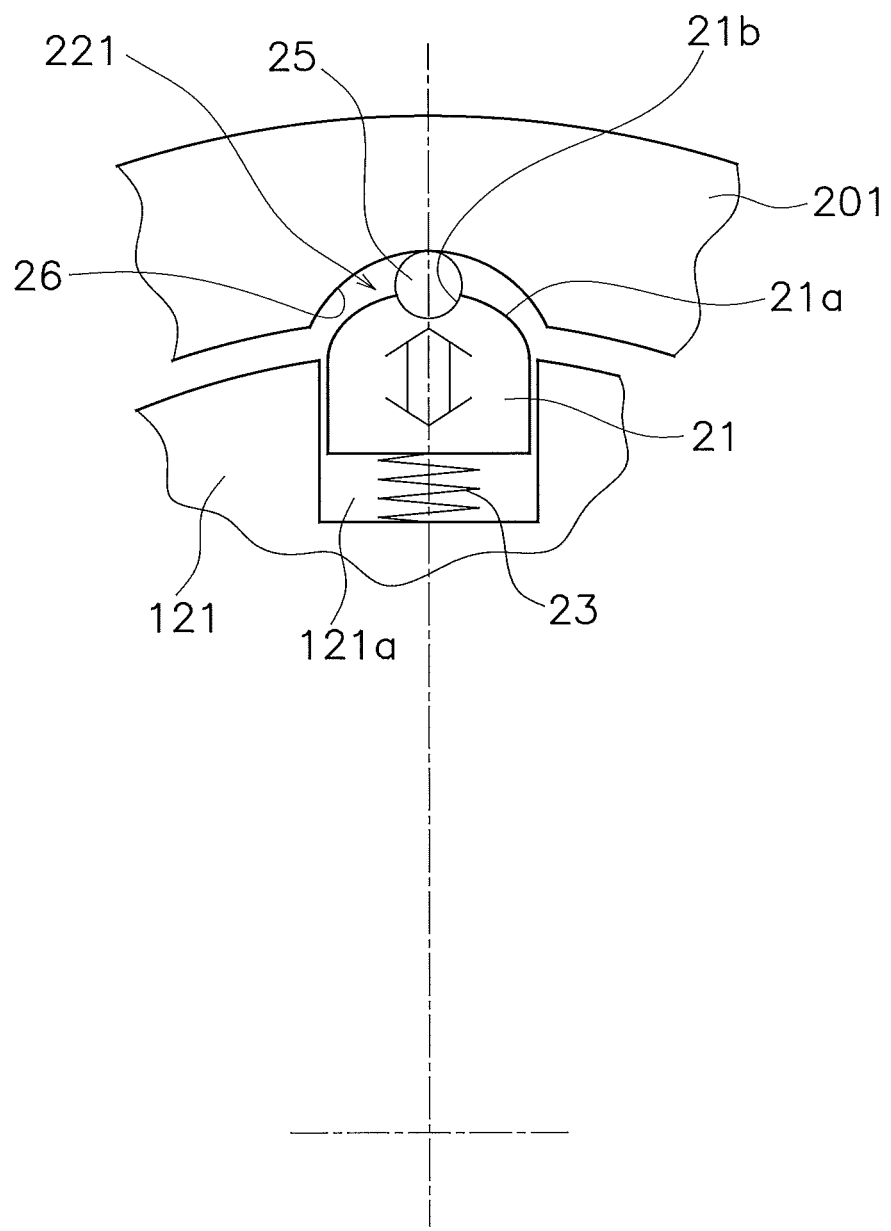
FIG. 4 is a partial enlarged view of FIG. 2A.

As shown close-up in FIG. 4, the first hub 121 includes recesses 121a on the outer peripheral surface thereof. Each recess 121a is recessed in a rectangular shape from the outer peripheral surface of the first hub 121 toward a rotational center located on the inner peripheral side. Additionally, the centrifugal elements 21 are inserted into the recesses 121a, respectively, and are radially movable therein. The centrifugal elements 21 and the recesses 121a are constructed such that a friction coefficient between the lateral surfaces of each centrifugal element 21 and each recess 121a is set to be less than or equal to 0.1. Moreover, each centrifugal element 21 is a plate having approximately the same thickness as the first hub 121, and includes an outer peripheral surface 21a having a circular-arc shape. Additionally, each centrifugal element 21 includes a roller accommodation part 21b recessed inside from the outer peripheral surface 21a.

As shown in FIG. 4, each first cam mechanism 221 is composed of a roller 25 as a cam follower and a cam 26 provided on the inner peripheral surface of the first inertia ring 201. The roller 25 is attached to the roller accommodation part 21b of each centrifugal element 21, and is radially movable together with each centrifugal element 21. It should be noted that the roller 25 can be rotatable in or fixed to the roller accommodation part 21b. The cam 26 is a circular-arc surface with which the roller 25 makes contact. The roller 25 is moved along the cam 26 when the first hub 121 and the first inertia ring 201 are rotated relatively to each other in a predetermined angular range.

Although described below in detail, when a rotational phase difference is produced between the first hub 121 and the first inertia ring 201 by the contact between each roller 25 and each cam 26, a centrifugal force generated in each centrifugal element 21 and each roller 25 is converted into a circumferential force by which the rotational phase difference is reduced.

Each coil spring 23 is disposed between the bottom surface of each recess 12a and the inner peripheral side surface of each centrifugal element 21, and urges each centrifugal element 21 to the outer peripheral side. Each centrifugal element 21 and each roller 25 are pressed onto each cam 26 of the first inertia ring 201 by the urging force of each coil spring 23. Therefore, each roller 25 makes contact with each cam 26 even when a centrifugal force does not act on each centrifugal element 21 in a condition that the first hub 121 is not being rotated.

Each second cam mechanism 222 is different from each first cam mechanism 221 only regarding the shape of each cam 26. The other configurations of each second cam mechanism 222 are completely the same as those of each first cam mechanism 221.

[Actuation of First Cam Mechanisms 221]

Actuation of each first cam mechanism 221 (inhibition of torque fluctuations) will be explained with FIGS. 4 and 5. In the lock-up on state, a torque transmitted to the front cover 2 is transmitted to the first hub 121 and the second hub 122 through the input-side rotor 11 and the damper 13.

When torque fluctuations do not exist in transmitting a torque, the first hub 121 and the first inertia ring 201 are rotated in the condition shown in FIG. 4. In other words, the roller 25 in each first cam mechanism 221 is contacted to the deepest position (the circumferential middle position) of the cam 26, and the rotational phase difference between the first hub 121 and the first inertia ring 201 is "0".

As described above, the rotation-directional relative displacement between the first hub 121 and the first inertia ring 201 is referred to as "rotational phase difference". In FIGS. 4 and 5, this indicates displacement between the circumferential middle position of each centrifugal element 21 and each roller 25 and that of each cam 26.

Figure 5:
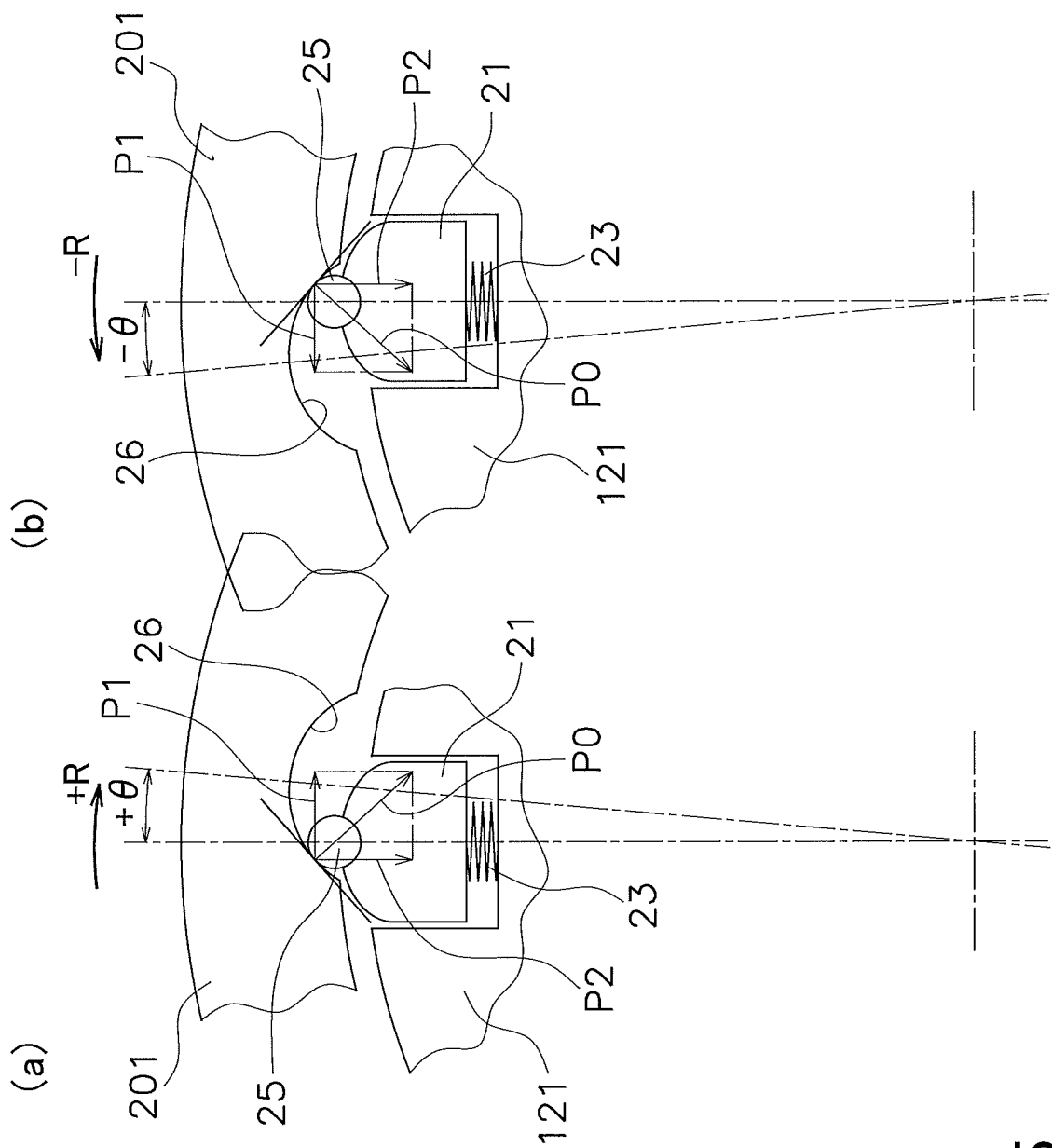
FIG. 5 is a diagram for explaining the actuation of a cam mechanism.

On the other hand, when torque fluctuations exist in transmitting a torque, rotational phase difference ±θ is produced between the first hub 121 and the first inertia ring 201 as shown in diagrams (a) and (b) of FIG. 5. FIG. 5(a) shows a condition that rotational phase difference +θ is produced to a +R side, whereas FIG. 5(b) shows a condition that rotational phase difference −θ is produced to a −R side.

As shown in FIG. 5(a), when the rotational phase difference +θ is produced between the first hub 121 and the first inertia ring 201, the roller 25 of each first cam mechanism 221 is relatively moved along the cam 26 to the left side in FIG. 5. At this time, a centrifugal force acts on the centrifugal element 21 and the roller 25. Hence, a reaction force to be received by the roller 25 from the cam 26 has a direction and a magnitude indicated by P0 in FIG. 5(a). A first force component P1 and a second force component P2 are produced by the reaction force P0. The first force component P1 is directed in the circumferential direction, whereas the second force component P2 is directed to move the centrifugal element 21 and the roller 25 toward the rotational center.

Additionally, the first force component P1 acts as a force to move the first hub 121 to the rightward in FIG. 5(a) through each first cam mechanism 221. In other words, a force directed to reduce the rotational phase difference between the first hub 121 and the first inertia ring 201 is supposed to act on the first hub 121. On the other hand, the second force component P2 moves the centrifugal element 21 and the roller 25 to the radially inner peripheral side against the urging force of the coil spring 23.

FIG. 5(b) shows a condition that the rotational phase difference −θ is produced between the first hub 121 and the first inertia ring 201. FIG. 5(b) is similar to FIG. 5(a) regarding the actuation of each first cam mechanism 221, although FIG. 5(b) is different from FIG. 5(a) only regarding the moving direction of the roller 25 of each first cam mechanism 221 and the directions of the reaction force P0, the first force component P1 and the second force component P2.

As described above, when rotational phase difference is produced between the first hub 121 and the first inertia ring 201 by torque fluctuations, the first hub 121 receives a force (first force component P1) directed to reduce the rotational phase difference between the both by the centrifugal force acting on each centrifugal element 21 and the working of each first cam mechanism 221. Torque fluctuations are inhibited by this force.

The aforementioned force to inhibit torque fluctuations varies in accordance with the centrifugal force, in other words, the rotational speed of the first hub 121, and also varies in accordance with the rotational phase difference and the shape of each cam 26. Therefore, by suitably setting the shape of each cam 26, characteristics of the torque fluctuation inhibiting device 14 can be made optimal in accordance with the specification of the engine and so forth.

For example, each cam 26 can be made in a shape that makes the first force component P1 linearly vary in accordance with the rotational phase difference in a condition where the centrifugal force acting is constant. Alternatively, each cam 26 can be made in a shape that makes the first force component P1 non-linearly vary in accordance with the rotational phase difference.

[Actuation of Second Cam Mechanisms 222]

The actuation of each second cam mechanism 222 is basically the same as that of each first cam mechanism 221. The difference between each second cam mechanism 222 and each first cam mechanism 221 is in characteristics of conversion from a centrifugal force into a circumferential force, which is due to difference in shape of each cam. Specifically, the cam 26 of each first cam mechanism 221 is made in a shape with a relatively small radius of curvature. By contrast, as is obvious from FIGS. 3A and 3B, the cam of each second cam mechanism 222 is made in a shape with a larger radius of curvature than the cam 26 of each first cam mechanism 221. Therefore, when the centrifugal element receives a centrifugal force in each first cam mechanism 221, the centrifugal force is converted into a circumferential force by a first conversion characteristic. By contrast, in each second cam mechanism 222, the centrifugal force is converted into a circumferential force by a second conversion characteristic different from the first conversion characteristic.

[Specifications of First and Second Cam Mechanisms 221 and 222]

As described above, each first cam mechanism 221 has the first conversion characteristic, whereas each second cam mechanism 222 has the second conversion characteristic. Therefore, when two cylinders are deactivated in a four-cylinder engine, for instance, torque fluctuations in actuation of four cylinders can be configured to be inhibited by the first conversion characteristic, whereas torque fluctuations in actuation of only two cylinders can be configured to be inhibited by the second conversion characteristic.

It should be noted that in four cylinder actuation, only the first cam mechanisms 221 work and torque fluctuations are inhibited by the first conversion characteristic, whereas second cam mechanisms 222 only work as inertia. On the other hand, these workings are opposite in two cylinder actuation: only the second cam mechanisms 222 work and toque fluctuations are inhibited by the second conversion characteristic, whereas the first cam mechanisms 221 only work as inertia.

In more detail, at an engine rotation of 1000 rpm, for instance, the anti-resonant frequency in a four-cylinder compliant torque fluctuation inhibiting device is 33.3 Hz, whereas that in a two-cylinder compliant torque fluctuation inhibiting device is 16.7 Hz. Therefore, torque fluctuations are effectively inhibited in each anti-resonant point by working of only either type of cam mechanism.

[Exemplary Characteristics]

Figure 6:
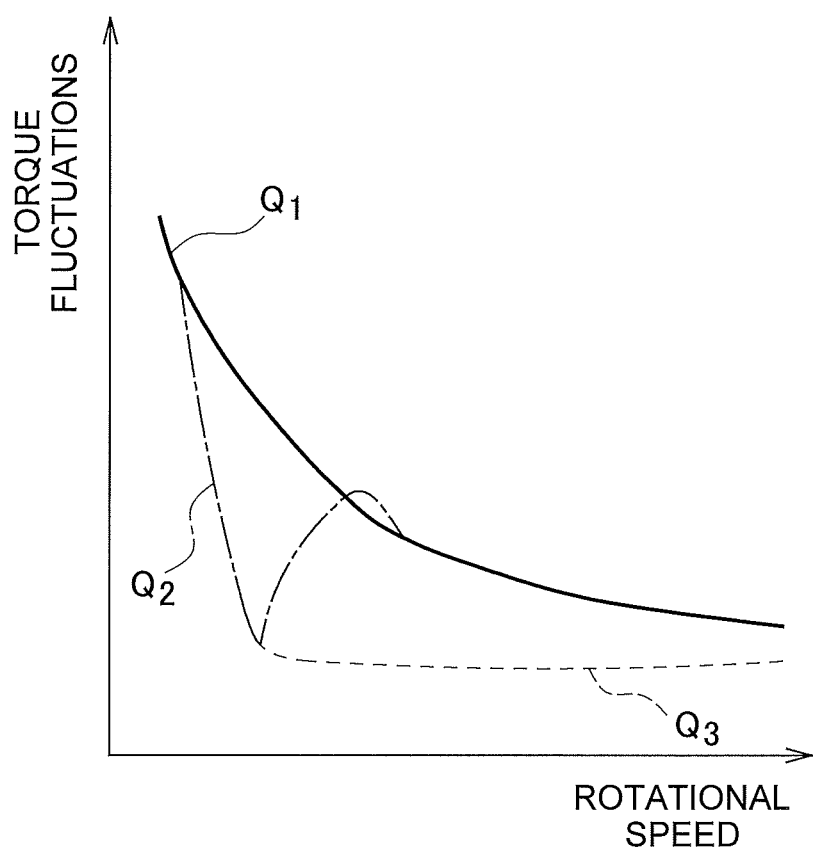
FIG. 6 is a characteristic diagram showing a relation between rotational speed and torque fluctuations.

FIG. 6 is a diagram showing exemplary torque fluctuation inhibiting characteristics. The horizontal axis indicates rotational speed, whereas the vertical axis indicates torque fluctuations (rotation velocity fluctuations). Characteristic Q1 indicates a condition without installation of a device for inhibiting torque fluctuations; characteristic Q2 indicates a condition with installation of a well-known dynamic damper device; and characteristic Q3 indicates a condition with installation of the torque fluctuation inhibiting device 14 of the present exemplary embodiment.

As is obvious from FIG. 6, in an apparatus in which the well-known dynamic damper device is installed (characteristic Q2), torque fluctuations can be inhibited only in a specific rotational speed range. By contrast, in the present exemplary embodiment (characteristic Q3), torque fluctuations can be inhibited through the entire rotational speed ranges.

Second Exemplary Embodiment

Figure 7:
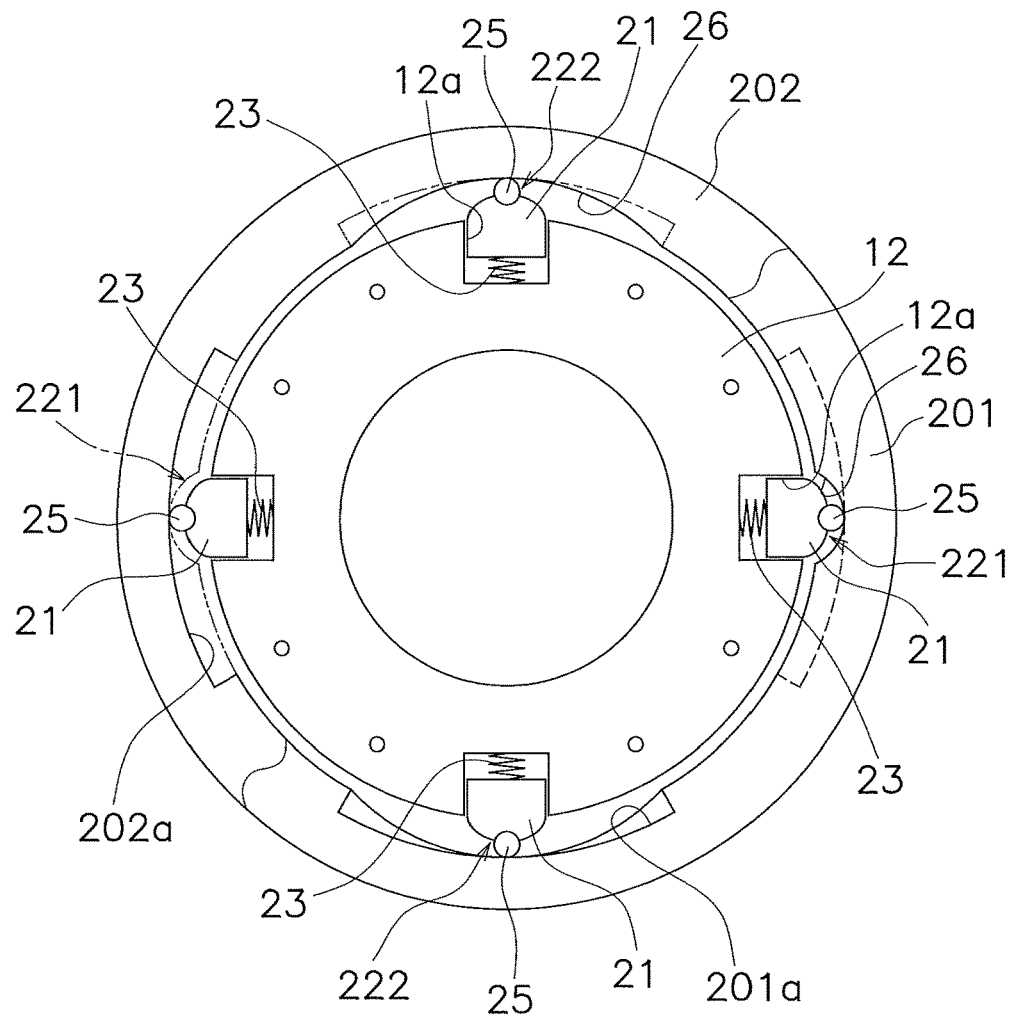
FIG. 7 is a front view of a torque fluctuation inhibiting device according to a second exemplary embodiment of the present disclosure.
Figure 8:
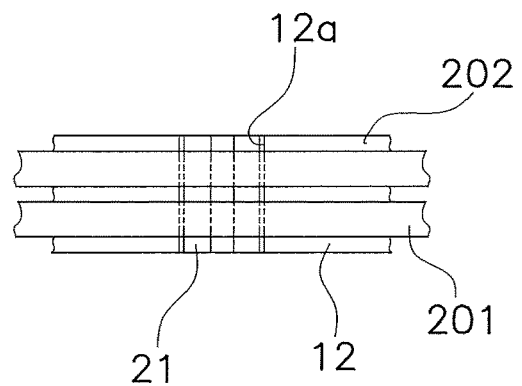
FIG. 8 is a partial plan view of the device shown in FIG. 7.

FIGS. 7 and 8 show a torque fluctuation inhibiting device according to a second exemplary embodiment of the present disclosure. In FIG. 7, the first inertia ring 201 is shown in a partially removed state. FIG. 8 is a partial plan view of FIG. 7. It should be noted that a given member, which is the same as or corresponds to a member in the first exemplary embodiment, is assigned and indicated with the same reference sign as the member in the first exemplary embodiment, even when the shape and so forth of the given member are different from those of the member in the first exemplary embodiment.

The torque fluctuation inhibiting device of the second exemplary embodiment includes the first and second inertia rings 201 and 202, four centrifugal elements 21, two first cam mechanisms 221, two second cam mechanisms 222 and four coil springs 23. The four centrifugal elements 21, the four first cam mechanisms 221 and the four second cam mechanisms 222 are disposed at equal angular intervals of 90 degrees in the circumferential direction, respectively. It should be noted that the coil springs 23 are provided in this example shown in FIG. 7, but can be omitted as described above.

Each of the first and second inertia rings 201 and 202 is a continuous annular plate with a predetermined thickness, and is disposed on the outer peripheral side of the output-side rotor 12 such that a predetermined gap is produced radially between each of the first and second inertia rings 201 and 202 and the output-side rotor 12. As shown in FIG. 8, the first and second inertia rings 201 and 202 are disposed axially in opposition to each other. Each of the first and second inertia rings 201 and 202 has a rotational axis, which is the same as that of the output-side rotor 12. Each of the first and second inertia rings 201 and 202 is rotatable with the output-side rotor 12, and is also rotatable relatively thereto.

The centrifugal elements 21 are disposed in the output-side rotor 12, and are radially movable by centrifugal forces to be generated by rotation of the output-side rotor 12. The relation between and configurations of the centrifugal elements 21 and the output-side rotor 12 are similar to those in the first exemplary embodiment. Specifically, the output-side rotor 12 includes recesses 12a on the outer peripheral surface thereof. The centrifugal elements 21 are inserted into the recesses 12a, respectively, and are radially movable therein. Moreover, each centrifugal element 21 is a plate having approximately the same thickness as the output-side rotor 12, and includes a roller accommodation part on the outer peripheral surface thereof.

The first cam mechanisms 221 are configured similarly to those in the first exemplary embodiment except for the number thereof. Specifically, the two first cam mechanisms 221 are disposed at angular intervals of 180 degrees in the circumferential direction. Each first cam mechanism 221 is composed of the roller 25 provided as a cam follower and one of the cams 26 provided on the inner peripheral surface of the first inertia ring 201. The roller 25 is attached to the roller accommodation part of the centrifugal element 21, and is radially movable with the centrifugal element 21. The cam 26 is a circular-arc surface with which the roller 25 makes contact. The roller 25 is moved along the cam 26 when the output-side rotor 12 and the first inertia ring 201 are rotated relatively to each other in a predetermined angular range.

The second cam mechanisms 222 are configured similarly to those in the first exemplary embodiment except for the number thereof. Specifically, the two second cam mechanisms 222 are disposed at angular intervals of 180 degrees in the circumferential direction. Each second cam mechanism 222 is composed of the roller 25 provided as a cam follower and one of the cams 26 provided on the inner peripheral surface of the second inertia ring 202. Additionally, each second cam mechanism 222 is different from each first cam mechanism 221 only regarding the shape of each cam 26, but is completely the same as each first cam mechanism 221 regarding the other configurations.

It should be noted that the first inertia ring 201 includes grooves 201a on the inner peripheral surface thereof. Each groove 201a has a predetermined length in the circumferential direction, and is located in a part that each second cam mechanism 222 is disposed. The outer peripheral surface of each groove 201a is made in the shape of a circular arc about the rotational center of both the output-side rotor 12 and the first inertia ring 201. Therefore, even when the roller 25 provided as a cam follower is moved inside the groove 201a, these constituent elements do not function as a cam mechanism.

Likewise, the second inertia ring 202 also includes grooves 202a on the inner peripheral surface thereof. Even when the roller 25 is moved inside each groove 202a, these constituent elements do not function as a cam mechanism.

[Actuation of First and Second Cam Mechanisms 221 and 222]

Regarding actuation of the first and second cam mechanisms 221 and 222 (inhibition of torque fluctuations), the basis thereof is similar to that in the first exemplary embodiment, although the number and layout of the first cam mechanisms 221 and those of the second cam mechanisms 222 are different from those in the first exemplary embodiment. Similarly to the first exemplary embodiment, even in this second exemplary embodiment, the force to inhibit torque fluctuations varies in accordance with the centrifugal force, in other words, the rotational speed of the output-side rotor 12, and also varies in accordance with the rotational phase difference and the shape of each cam 26. Therefore, by suitably setting the shape of each cam 26, characteristics of the torque fluctuation inhibiting device can be made optimal in accordance with the specification of the engine and so forth.

Additionally, similarly to the first exemplary embodiment, even when two cylinders are deactivated in a four-cylinder engine, for instance, torque fluctuations in actuation of four cylinders can be configured to be inhibited by the first conversion characteristic of each first cam mechanism 221, whereas torque fluctuations in actuation of only two cylinders can be configured to be inhibited by the second conversion characteristic of each second cam mechanism 222.

Third Exemplary Embodiment

Figure 9:
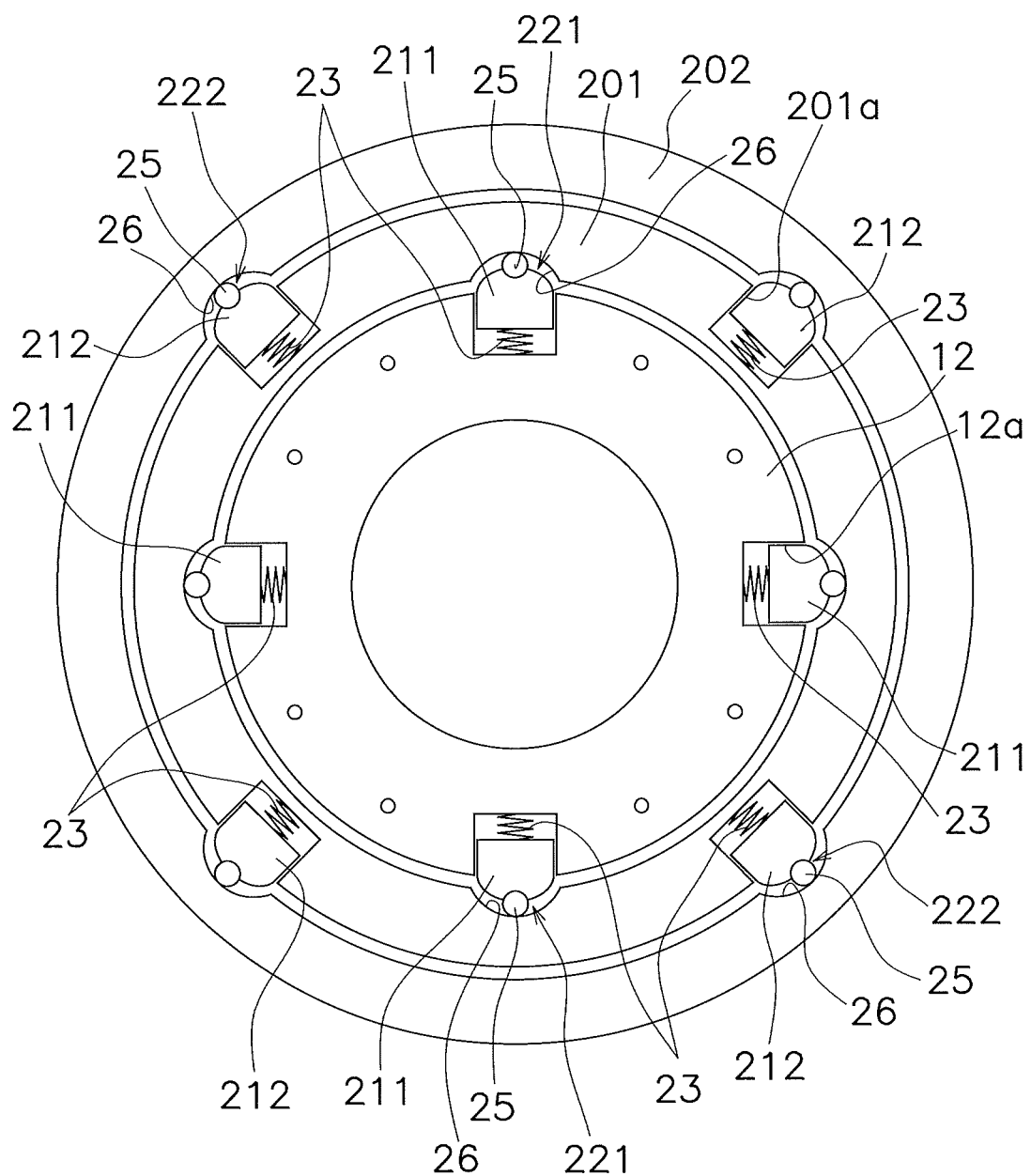
FIG. 9 is a front view of a torque fluctuation inhibiting device according to a third exemplary embodiment of the present disclosure.

FIG. 9 shows a torque fluctuation inhibiting device according to a third exemplary embodiment of the present disclosure. It should be noted that a given member, which is the same as or corresponds to a member in the first exemplary embodiment, is assigned and indicated with the same reference sign as the member in the first exemplary embodiment, even when the shape and so forth of the given member are different from those of the member in the first exemplary embodiment.

The torque fluctuation inhibiting device of the third exemplary embodiment includes the first and second inertia rings 201 and 202, four first centrifugal elements 211, four second centrifugal elements 212, four first cam mechanisms 221, four second cam mechanisms 222 and eight coil springs 23. The four centrifugal elements 211, the four centrifugal elements 212, the four cam mechanisms 221 and the four cam mechanisms 222 are disposed at equal angular intervals of 90 degrees in the circumferential direction, respectively. It should be noted that the coil springs 23 are provided in this example shown in FIG. 9, but can be omitted as described above.

The first inertia ring 201 is a continuous annular plate with a predetermined thickness, and is disposed on the outer peripheral side of the output-side rotor 12 such that a predetermined gap is produced radially between the first inertia ring 201 and the output-side rotor 12. The first inertia ring 201 has a rotational axis, which is the same as that of the output-side rotor 12. The first inertia ring 201 is rotatable with the output-side rotor 12, and is also rotatable relatively thereto.

The second inertia ring 202 is a continuous annular plate with a predetermined thickness, and is disposed on the further outer peripheral side of the first inertia ring 201 such that a predetermined gap is produced radially between the second inertia ring 202 and the first inertia ring 201. The second inertia ring 202 has a rotational axis, which is the same as that of both the output-side rotor 12 and the first inertia ring 201. The second inertia ring 202 is rotatable with the output-side rotor 12 and the first inertia ring 201, and is also rotatable relatively to the output-side rotor 12 and the first inertia ring 201.

The first centrifugal elements 211 and the second centrifugal elements 212 are different from each other regarding their disposed locations, but are the same as each other regarding their configurations and shapes. The first centrifugal elements 211 are disposed in the output-side rotor 12, and are radially movable by centrifugal forces to be generated by rotation of the output-side rotor 12. The second centrifugal elements 212 are disposed in the first inertia ring 201, and are radially movable by centrifugal forces to be generated by rotation of the first inertia ring 201.

The relation between and configurations of the centrifugal elements 211, 212 and both the output-side rotor 12 and the inertia ring 201 are similar to those in the first exemplary embodiment. Specifically, the output-side rotor 12 includes recesses 12a on the outer peripheral surface thereof. The first centrifugal elements 211 are inserted into the recesses 12a, respectively, and are radially movable therein. On the other hand, the first inertia ring 201 includes recesses 201a similar to the recesses 12a of the output-side rotor 12. The second centrifugal elements 212 are inserted into the recesses 201a, respectively, and are radially movable therein. Moreover, each centrifugal element 211, 212 is a plate having approximately the same thickness as the output-side rotor 12, and includes a roller accommodation part on the outer peripheral surface thereof.

The first cam mechanisms 221 are configured similarly to those in the first exemplary embodiment. Specifically, the four first cam mechanisms 221 are disposed at angular intervals of 90 degrees in the circumferential direction. Each first cam mechanism 221 is composed of the roller 25 provided as a cam follower and one of the cams 26 provided on the inner peripheral surface of the first inertia ring 201. The roller 25 is attached to the roller accommodation part of the first centrifugal element 211, and is radially movable with the first centrifugal element 211. The cam 26 is a circular-arc surface with which the roller 25 makes contact. The roller 25 is moved along the cam 26 when the output-side rotor 12 and the first inertia ring 201 are rotated relatively to each other in a predetermined angular range.

The second cam mechanisms 222 are configured similarly to the first cam mechanisms 221 except for their disposed locations. Specifically, the four second cam mechanisms 222 are disposed at angular intervals of 90 degrees in the circumferential direction. Each second cam mechanism 222 is composed of the roller 25 provided as a cam follower and one of the cams 26 provided on the inner peripheral surface of the second inertia ring 202. It should be noted that the cam 26 of each first cam mechanism 221 and that of each second cam mechanism 222 are the same as each other regarding the shapes thereof, but are different from each other regarding the radially provided positions thereof.

[Actuation of First and Second Cam Mechanisms 221 and 222]

Regarding actuation of the first and second cam mechanisms 221 and 222 (inhibition of torque fluctuations), the basis thereof is similar to that in the first exemplary embodiment. It should be noted that the cam 26 of each first cam mechanism 221 and that of each second cam mechanism 222 have the same shape, but a radius at a position in which each second centrifugal element 212 is disposed is greater than that at a position in which each first centrifugal element 211 is disposed. Therefore, at the same rotational speed, a centrifugal force acting on the roller 25 (the cam follower: the second centrifugal elements 212) of each second cam mechanism 222 is greater than that acting on the roller 25 (the first centrifugal element 211) of each first cam mechanism 221. Therefore, at the same rotational speed, a force exerted by each second cam mechanism 222 to inhibit torque fluctuations becomes greater than that exerted by each first cam mechanism 221 to inhibit torque fluctuations.

Similarly to the first exemplary embodiment, even in the third exemplary embodiment herein described, the force to inhibit torque fluctuations varies in accordance with the centrifugal force, in other words, the rotational speed of the output-side rotor 12, and also varies in accordance with the rotational phase difference and the shape of each cam 26. Therefore, by suitably setting the shape of each cam 26, characteristics of the torque fluctuation inhibiting device can be made optimal in accordance with the specification of the engine and so forth.

Additionally, similarly to the first exemplary embodiment, even when two cylinders are deactivated in a four-cylinder engine, for instance, torque fluctuations in actuation of four cylinders can be configured to be inhibited by the first cam mechanisms 221, whereas torque fluctuations in actuation of only two cylinders can be configured to be inhibited by the second cam mechanisms 222.

Fourth Exemplary Embodiment

Figure 10:
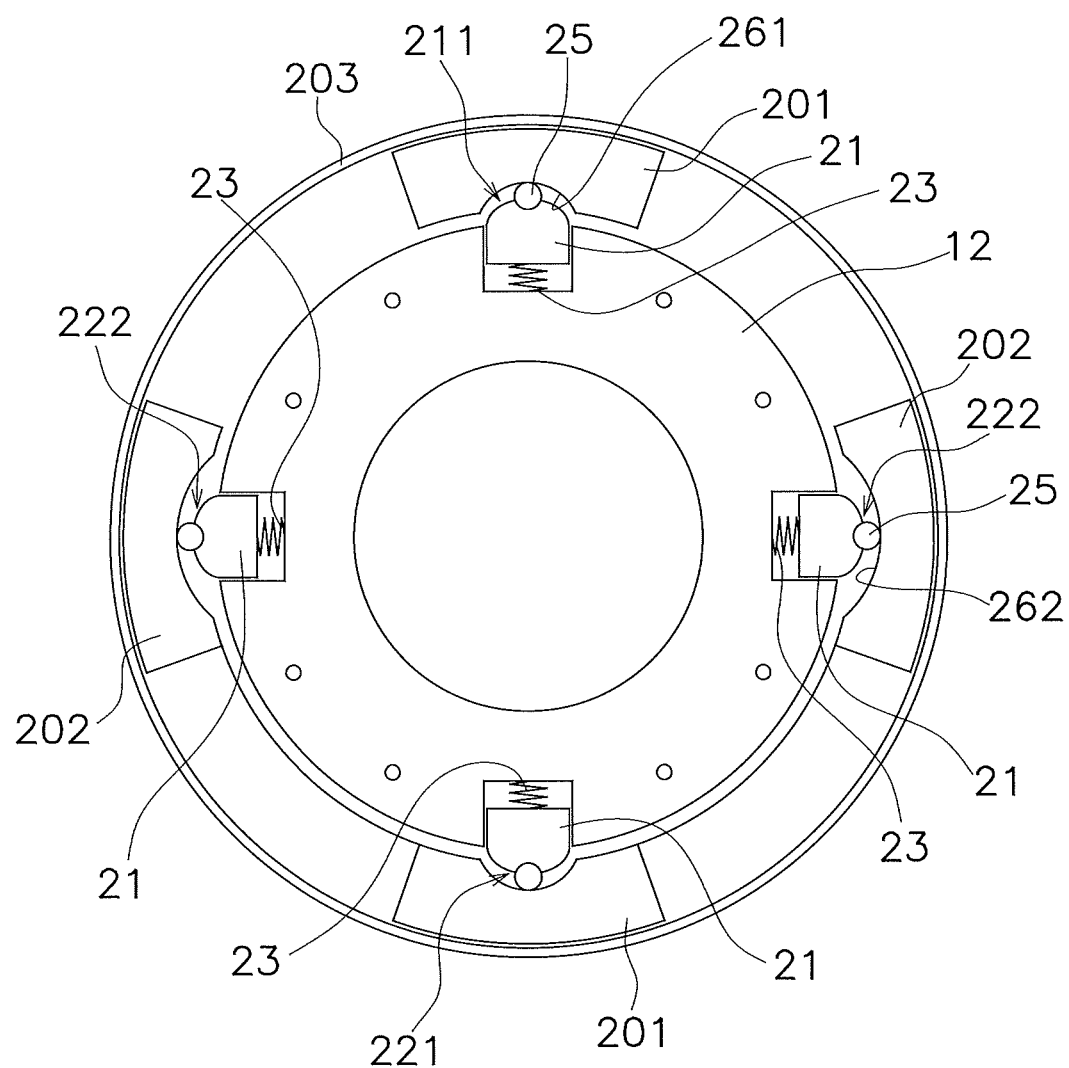
FIG. 10 is a front view of a torque fluctuation inhibiting device according to a fourth exemplary embodiment of the present disclosure.

FIG. 10 shows a torque fluctuation inhibiting device according to a fourth exemplary embodiment. It should be noted that a given member, which is the same as or corresponds to a member in the first exemplary embodiment, is assigned and indicated with the same reference sign as the member in the first exemplary embodiment, even when the shape and so forth of the given member are different from those of the member in the first exemplary embodiment. In the aforementioned respective exemplary embodiments, the mass body is composed of a continuous annular member. However, in the fourth exemplary embodiment, the mass body is composed of a plurality of divided inertia bodies 201 and 202 disposed in circumferential alignment. The other configurations of the output-side rotor 12, the centrifugal elements 21 and so forth are similar to those in the other exemplary embodiments.

In this exemplary embodiment, the mass body is composed of two first inertia bodies 201 and two second inertia bodies 202. The two first inertia bodies 201 are disposed in opposition through the rotational axis. Likewise, the two second inertia bodies 202 are also disposed in opposition through the rotational axis. Each first inertia body 201 and each second inertia body 202 are disposed in positions shifted at an angle of 90 degrees. Additionally, a holding ring 203 is provided on the outer peripheral side of the respective inertia bodies 201 and 202 in order to radially hold the respective inertia bodies 201 and 202.

Each first inertia body 201 includes a cam 261, having a similar shape to the first inertia ring 201 in the first exemplary embodiment, on the inner peripheral surface thereof. On the other hand, each second inertia body 202 includes a cam 262, having a similar shape to that of the second inertia ring 202 in the first exemplary embodiment, on the inner peripheral surface thereof. Additionally, each of the first and second cam mechanisms 221 and 222 is composed of the roller 25 provided as a cam follower on the outer peripheral surface of each centrifugal element 21 and the cam 261 and 262 provided on the inner peripheral surface of each of the inertia bodies 201 and 202.

Excluding that the amount of inertia exerted by each of the first and second inertia bodies 201 and 202 is small, the first and second cam mechanisms 221 and 222 are actuated similarly to those in the first exemplary embodiment. Working effects similar to those achieved in the respective exemplary embodiments can be also achieved in the fourth exemplary embodiment herein described.

Fifth Exemplary Embodiment

Figure 11:
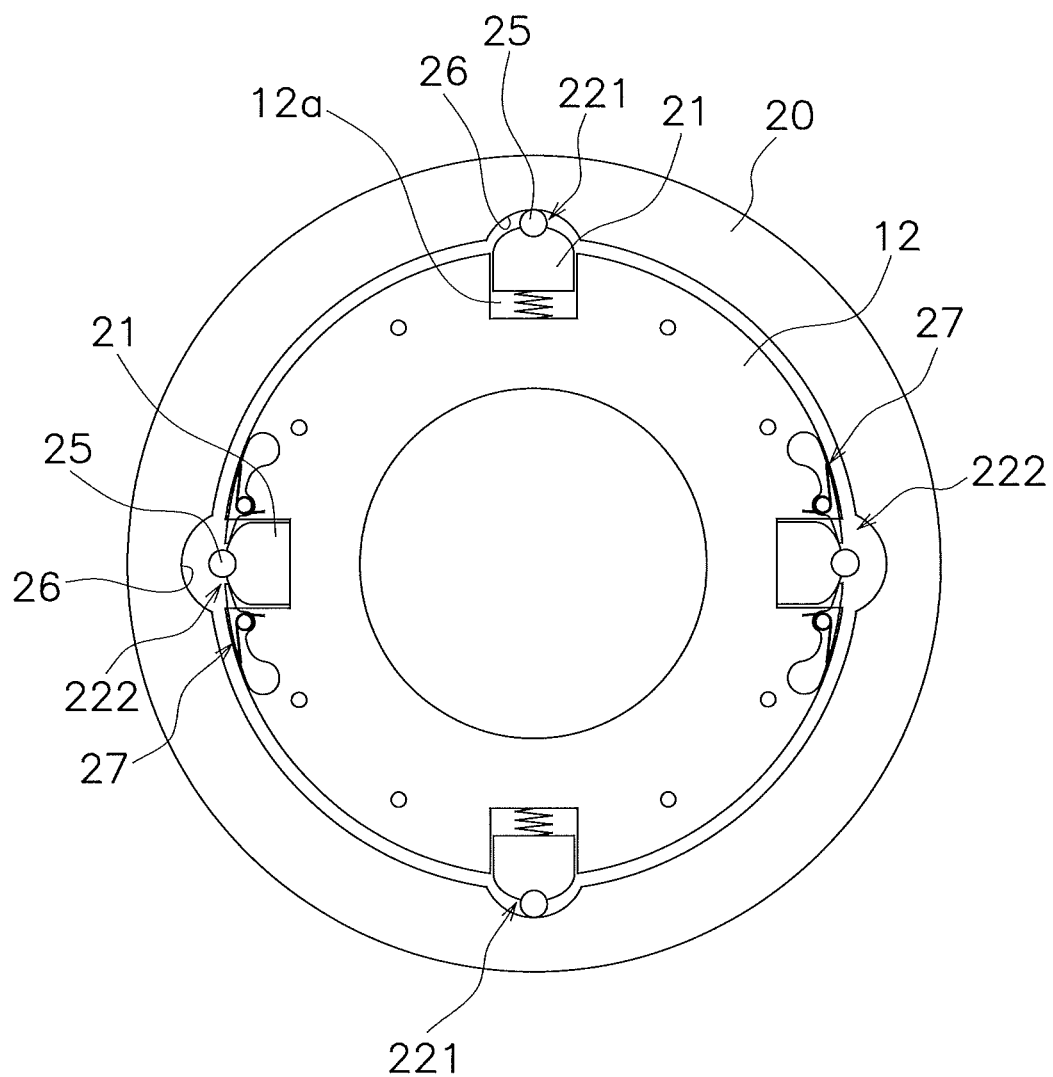
FIG. 11 is a front view of a torque fluctuation inhibiting device according to a fifth exemplary embodiment of the present disclosure.

FIG. 11 shows a torque fluctuation inhibiting device according to a fifth exemplary embodiment. It should be noted that a given member, which is the same as or corresponds to a member in the first exemplary embodiment, is assigned and indicated with the same reference sign as the member in the first exemplary embodiment, even when the shape and so forth of the given member are different from those of the member in the first exemplary embodiment. Similarly to the fourth exemplary embodiment, in the fifth exemplary embodiment, two first cam mechanisms 221 and two second cam mechanisms 222 are disposed on the circumference of a common imaginary circle.

The configuration of each first cam mechanism 221 is completely the same as that in the first exemplary embodiment. Additionally, the configuration that the output-side rotor 12 includes the recesses 12a and the centrifugal elements 21 are disposed in the recesses 12a, respectively, so as to be radially movable therein and the configuration of each centrifugal element 21 are similar to those in the respective exemplary embodiments.

The configuration of each second cam mechanism 222 is similar to that of each first cam mechanism 221 except for an actuation preventing mechanism 27 provided in the location of each second cam mechanism 222. In other words, each second cam mechanism 222 includes the roller 25 provided as a cam follower and one of the cams 26 provided on the inner peripheral surface of an inertia ring 20.

The actuation preventing mechanisms 27 are disposed in opposition through the rotational axis. In other words, the actuation preventing mechanisms 27 restrict radial movement of opposed two of four centrifugal elements 21, and besides, restrict actuation of their corresponding cam mechanisms 22.

Figure 12:
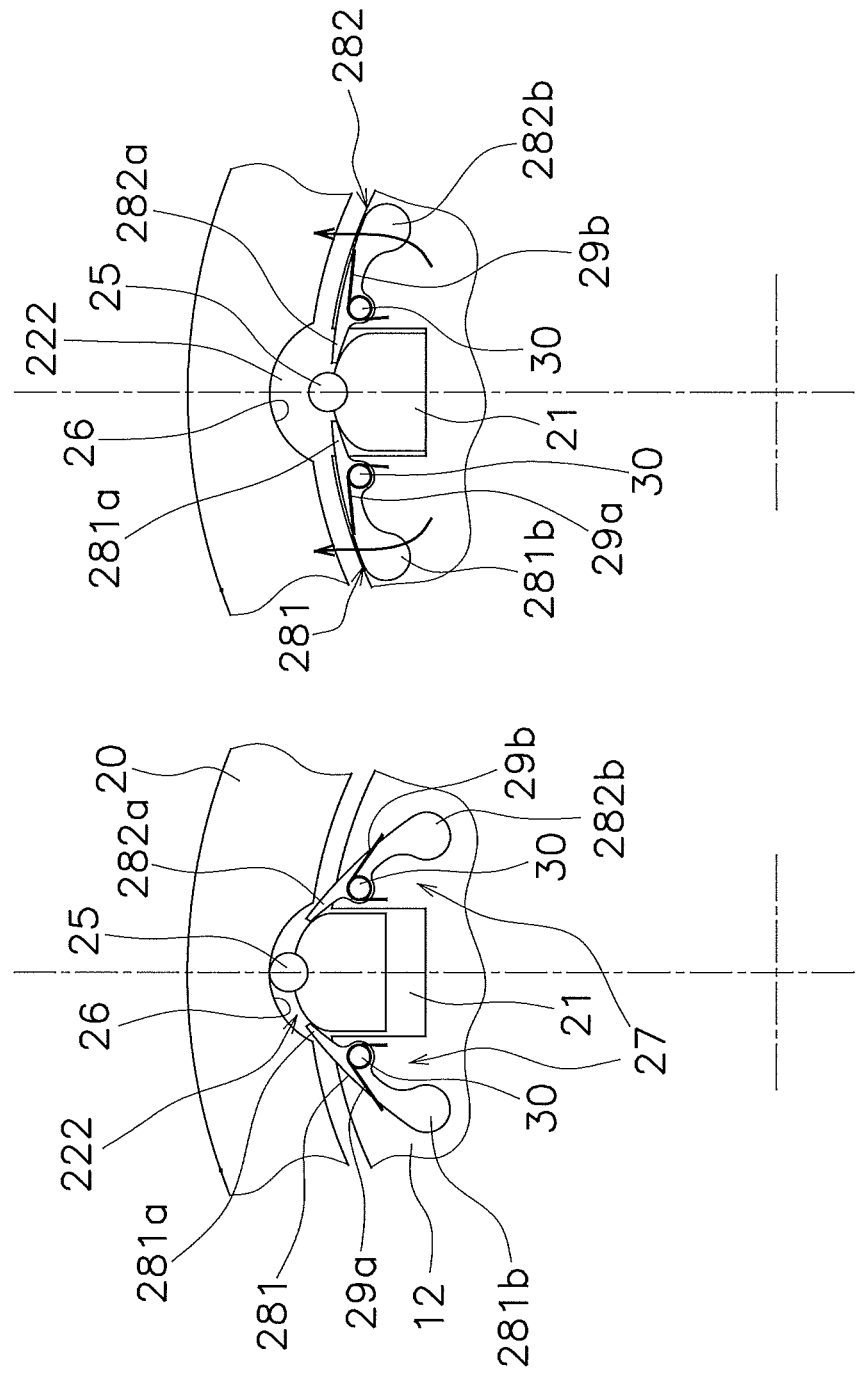
FIG. 12 is a diagram for explaining the actuation of a cam mechanism according to the fifth exemplary embodiment of the present disclosure.

As shown close-up in FIG. 12, each actuation preventing mechanism 27 includes a pair of turn members 281 and 282 and torsion springs 29a and 29b for holding the pair of turn members 281 and 282 in actuation allowed postures shown in diagram (a) of FIG. 12. The pair of turn members 281 and 282 is disposed such that their corresponding centrifugal element 21 is circumferentially interposed therebetween. The pair of turn members 281 and 282 is disposed to be symmetric to each other with respect to the corresponding centrifugal element 21.

The turn member 281, which is one of the pair of turn members, is turnably supported by one of pins 30 fixed to the output-side rotor 12. In other words, the turn member 281 is turnable about the pin 30 in parallel to the lateral surface of the output-side rotor 12. The turn member 281 includes a pawl part 281a on the centrifugal element 21 side of the pin 30 and includes a weight part 281b on the opposite side of the pawl part 281a. The length of the pawl part 281a is set such that the pawl part 281a is capable of making contact with the outer peripheral surface of the corresponding centrifugal element 21. Additionally, the turn member 282, which is the other of the pair of turn members, also has a configuration similar to the above, and includes a pawl part 282a and a weight part 282b.

When external forces (centrifugal forces by rotation) are not acting on the pair of turn members 281 and 282, the pair of turn members 281 and 282 are held in the allowed postures as shown in FIG. 12(a) by the torsion springs 29a and 29b. In other words, the pawl parts 281a and 282a of the pair of turn members 281 and 282 are directed to the outer peripheral side, and the corresponding centrifugal element 21 is freely movable in the radial direction.

On the other hand, when the output-side rotor 12 is rotated at a predetermined speed or greater, the centrifugal forces acting on the weight parts 281b and 282b of the pair of turn members 281 and 282 become greater than the centrifugal force acting on the corresponding centrifugal element 21 and the holding forces of the torsion springs 29a and 29b. In this case, as shown in diagram (b) of FIG. 12, the weight parts 281b and 282b of the pair of turn members 281 and 282 are moved to the outer peripheral side, whereas the pawl parts 281a and 282a of the pair of turn members 281 and 282 are moved to the inner peripheral side. In such a condition, radial movement of the corresponding centrifugal element 21 is prevented by the pawl parts 281a and 282a. Therefore, the roller 25, provided as a cam follower on the corresponding centrifugal element 21, can no longer make contact with the corresponding cam 26, whereby the corresponding cam mechanism 222 is no longer actuated.

As described above, in the fifth exemplary embodiment, when the output-side rotor 12 is rotated at less than the predetermined rotational speed, both the first cam mechanisms 221 and the second cam mechanisms 222 are actuated. However, when the output-side rotor 12 is rotated at the predetermined rotational speed or greater, only the first cam mechanisms 221 are actuated, whereas the second cam mechanisms 222 are no longer actuated. Therefore, torque fluctuations can be effectively inhibited by suitably setting the shapes of the cams 26 of two types of cam mechanisms 221 and 222 and the shapes of the turn members 281 and 282 in accordance with the specification of the engine and so forth.

Sixth Exemplary Embodiment

Figure 13:
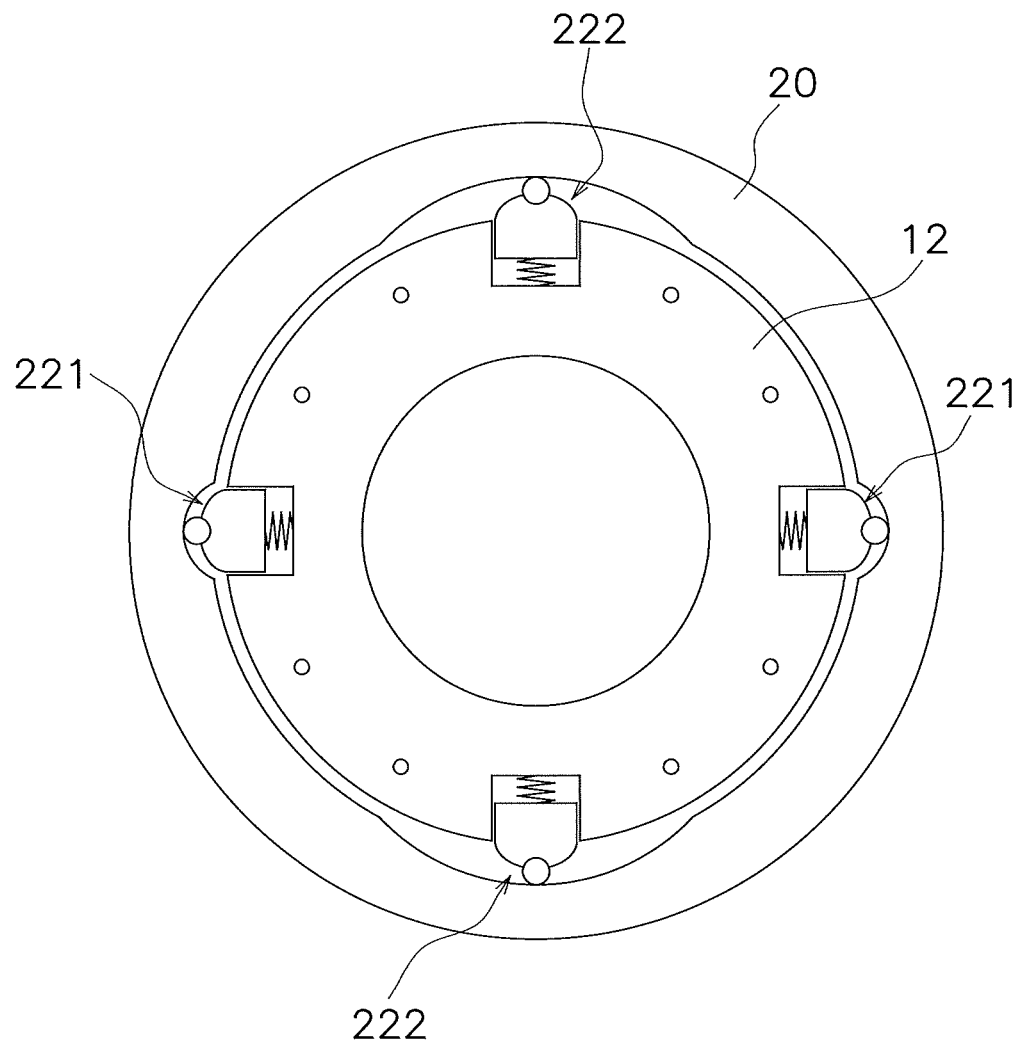
FIG. 13 is a front view of a torque fluctuation inhibiting device according to a sixth exemplary embodiment of the present disclosure.

FIG. 13 shows a sixth exemplary embodiment. The sixth exemplary embodiment is an embodiment in which two first cam mechanisms 221 and two second cam mechanisms 222 are disposed in one output-side rotor 12 and one inertia ring 20. The configurations of the respective cam mechanisms 221 and 222 are similar to those in the first exemplary embodiment, and hence, will not be hereinafter explained. It should be noted that in the sixth exemplary embodiment, characteristics of inhibiting torque fluctuations are different from those in the first exemplary embodiment, and are produced by combining characteristics of the first cam mechanisms 221 and those of the second cam mechanisms 222.

Other Exemplary Embodiments

The present disclosure is not limited to the exemplary embodiment described above, and a variety of changes or modifications can be made without departing from the scope of the present disclosure.

Figure 14:
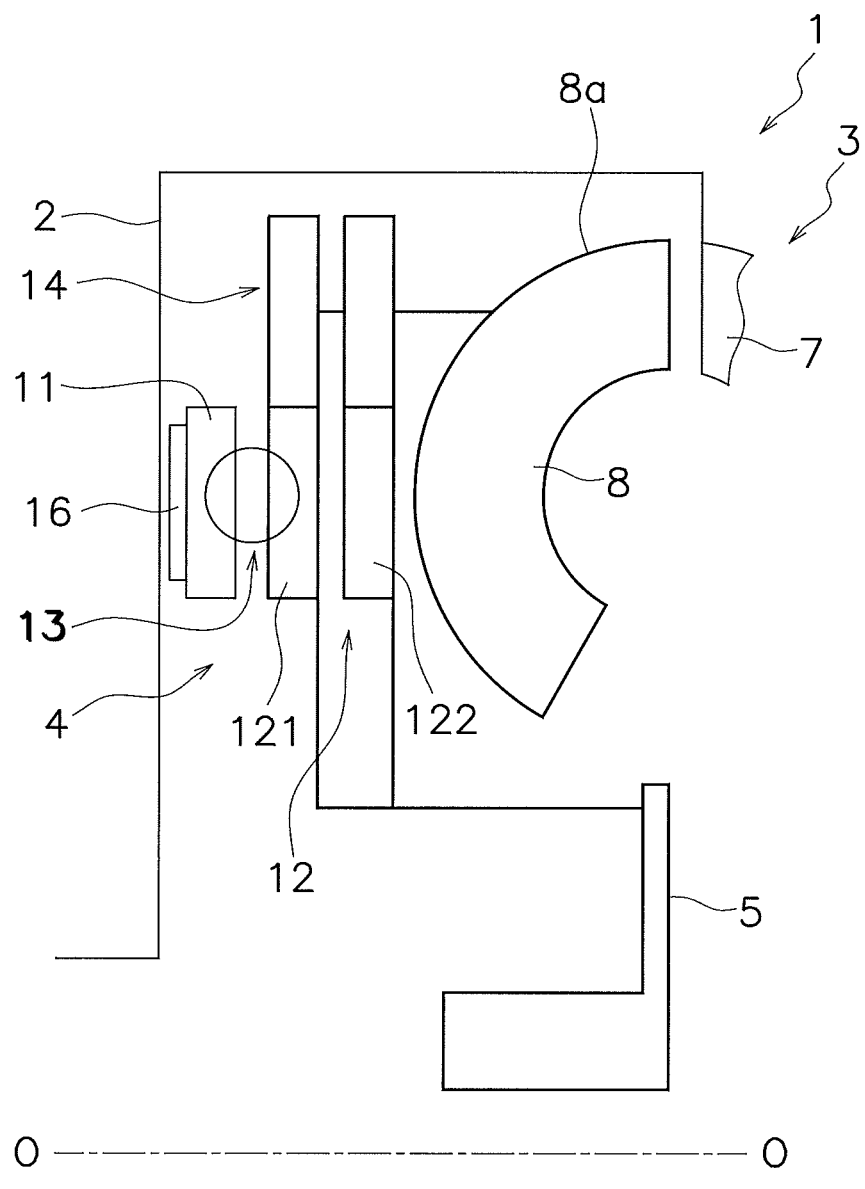
FIG. 14 is a diagram showing yet another exemplary embodiment of the present disclosure and corresponds to FIG. 1.

(a) As shown in FIG. 14, an inertia ring, composing the torque fluctuation inhibiting device, can be configured to be coupled to the turbine 8. In this case, the turbine 8 is not coupled to the output hub 5. In this example, the inertia ring is coupled to the turbine 8 (exactly speaking, a turbine shell 8*a*), and hence, the turbine shell 8*a* also functions as an inertia element (an inertia body) together with the inertia ring.

It should be noted that in an exemplary embodiment shown in FIG. 14, when the lock-up off state is made, a torque from the torque converter body 3 is transmitted from the torque fluctuation inhibiting device 14 to the output-side rotor 12 through the turbine 8, and is then outputted to the output hub 5. At this time, it is difficult to transmit a torque (not torque fluctuations but steady average torque) from the inertia ring to the output-side rotor 12 through the cam mechanisms. Therefore, it is required to reliably produce an angular range in which each of the cam mechanisms is actuated, and besides, it is required to produce a configuration to transmit a torque with springs, mechanical stoppers or so forth.

Figure 15:
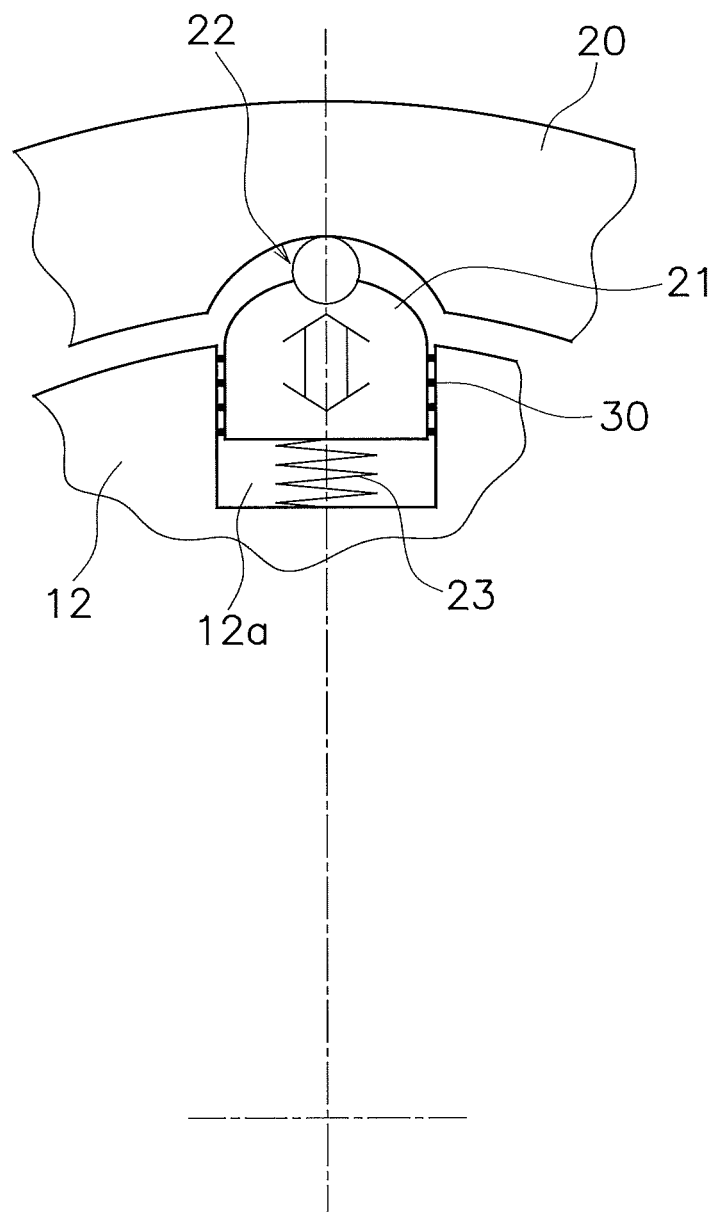
FIG. 15 is a diagram showing further yet another exemplary embodiment of the present disclosure and corresponds to FIG. 4.

(b) As shown in FIG. 15, at least one member for reducing friction, taking the form of a roller, a resin race, a sheet or so forth, can be disposed between each centrifugal element 21 and each recess 12*a*.

Application Examples

The torque fluctuation inhibiting device described above can be disposed in a variety of settings when applied to a torque converter or other types of power transmission device. Specific application examples will be hereinafter explained with use of schematic diagrams of the torque converter and the other types of power transmission device. It should be noted that cam mechanisms are simply illustrated in drawings that show the following respective examples. However, the configurations of the cam mechanisms in the aforementioned respective exemplary embodiments are applicable to all the cam mechanisms in the following respective examples.

Figure 16:
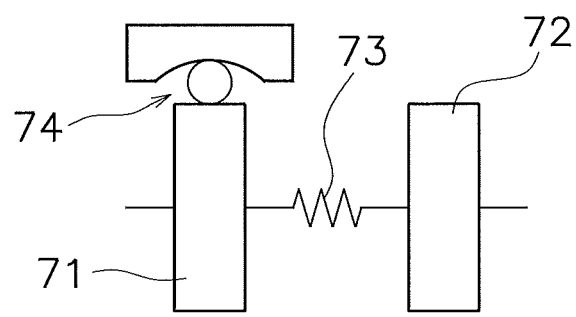
FIG. 16 is a schematic diagram showing application example 1 of the present disclosure.

(a) FIG. 16 is a diagram schematically showing a torque converter. The torque converter includes an input-side rotor 71, an output-side rotor 72 and a damper 73 disposed between both rotors 71 and 72. The input-side rotor 71 includes members such as a front cover, a drive plate and a piston. The output-side rotor 72 includes a driven plate and a turbine hub. The damper 73 includes a plurality of torsion springs.

In the example shown in FIG. 16, a centrifugal element is provided on any of the rotary members composing the input-side rotor 71, and a cam mechanism 74 is provided to be actuated with use of a centrifugal force acting on the centrifugal element. A configuration applicable to the cam mechanism 74 is similar to that in the aforementioned respective exemplary embodiments.

Figure 17:
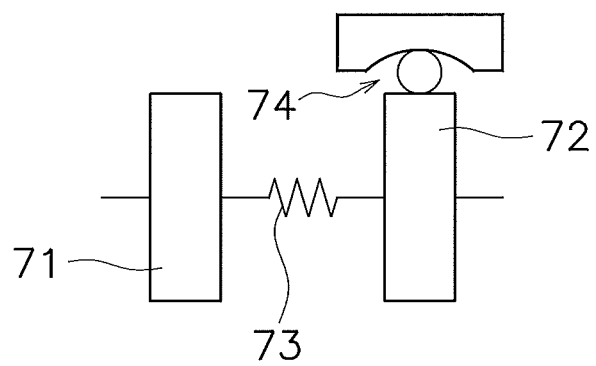
FIG. 17 is a schematic diagram showing application example 2 of the present disclosure.

(2) In a torque converter shown in FIG. 17, a centrifugal element is provided on any of the rotary members composing the output-side rotor 72, and the cam mechanism 74 is provided to be actuated with use of a centrifugal force acting on the centrifugal element. A configuration applicable to the cam mechanism 74 is similar to that in the aforementioned respective exemplary embodiments.

Figure 18:
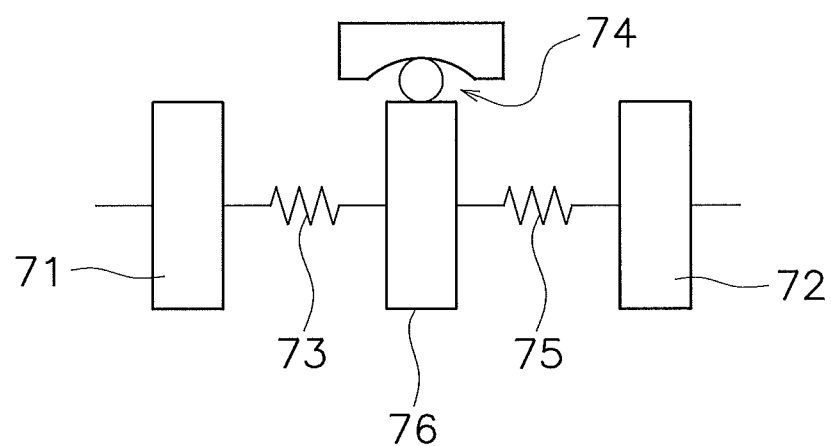
FIG. 18 is a schematic diagram showing application example 3 of the present disclosure.

(3) A torque converter shown in FIG. 18 includes another damper 75 and an intermediate member 76 provided between the two dampers 73 and 75 in addition to the configurations shown in FIGS. 16 and 17. The intermediate member 76 is rotatable relatively to the input-side rotor 71 and the output-side rotor 72, and makes the two dampers 73 and 75 act in series.

In the example shown in FIG. 18, a centrifugal element is provided on the intermediate member 76, and the cam mechanism 74 is provided to be actuated with use of a centrifugal force acting on the centrifugal element. A configuration applicable to the cam mechanism 74 is similar to that in the aforementioned respective exemplary embodiments.

Figure 19:
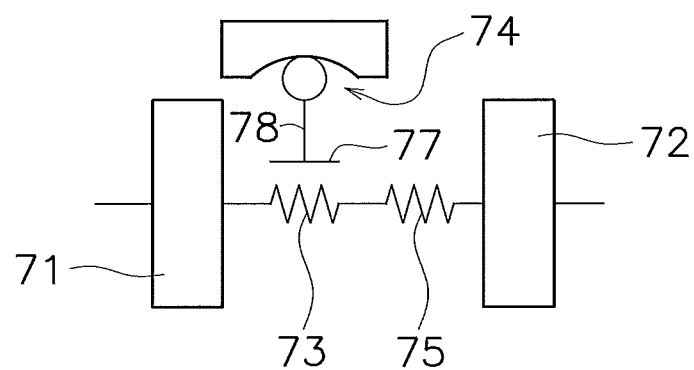
FIG. 19 is a schematic diagram showing application example 4 of the present disclosure.

(4) A torque converter shown in FIG. 19 includes a float member 77. The float member 77 is a member for supporting at least one torsion spring composing the damper 73. For example, the float member 77 has an annular shape and is disposed to cover the at least one torsion spring from the outer peripheral side and at least one lateral side. Additionally, the float member 77 is rotatable relatively to the input-side rotor 71 and the output-side rotor 72, and is rotated together with the damper 73 by friction with the at least one torsion spring of the damper 73. In other words, the float member 77 is also rotated.

In the example shown in FIG. 19, a centrifugal element 78 is provided on the float member 77, and the cam mechanism 74 is provided to be actuated with use of a centrifugal force acting on the centrifugal element 78. A configuration applicable to the cam mechanism 74 is similar to that in the aforementioned respective exemplary embodiments.

Figure 20:
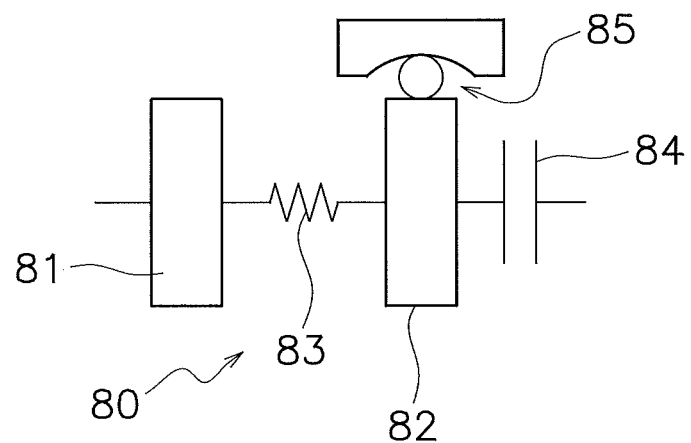
FIG. 20 is a schematic diagram showing application example 5 of the present disclosure.

(5) FIG. 20 is a schematic diagram of a power transmission device that includes a flywheel 80, composed of two inertia bodies 81 and 82, and a clutch device 84. In other words, the flywheel 80, disposed between the engine and the clutch device 84, includes the first inertia body 81, the second inertia body 82 and a damper 83. The second inertia body 82 is disposed to be rotatable relatively to the first inertia body 81. The damper 83 is disposed between the two inertia bodies 81 and 82. It should be noted that the second inertia body 82 includes a clutch cover composing the clutch device 84 as one of the constituent members thereof.

In the example shown in FIG. 20, a centrifugal element is provided on any of the rotary members composing the second inertia body 82, and a cam mechanism 85 is provided to be actuated with use of a centrifugal force acting on the centrifugal element. A configuration applicable to the cam mechanism 85 is similar to that in the aforementioned respective exemplary embodiments.

Figure 21:
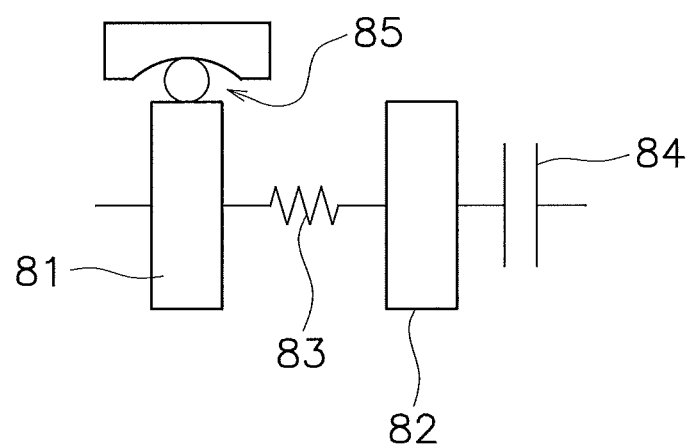
FIG. 21 is a schematic diagram showing application example 6 of the present disclosure.

(6) FIG. 21 shows an example of a power transmission device similar to that in FIG. 20. In this example, a centrifugal element is provided on the first inertia body 81. Additionally, the cam mechanism 85 is provided to be actuated with use of a centrifugal force acting on the centrifugal element. A configuration applicable to the cam mechanism 85 is similar to that in the aforementioned respective exemplary embodiments.

Figure 22:
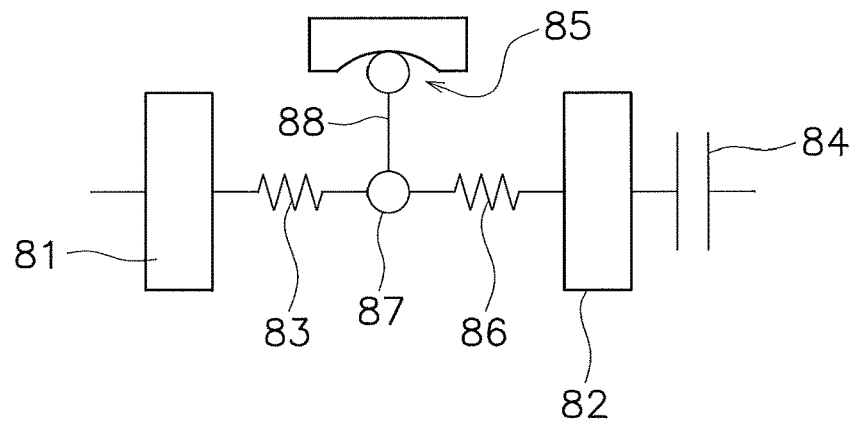
FIG. 22 is a schematic diagram showing application example 7 of the present disclosure.

(7) A power transmission device shown in FIG. 22 includes another damper 86 and an intermediate member 87 provided between the two dampers 83 and 86 in addition to the configurations shown in FIGS. 20 and 21. The intermediate member 87 is rotatable relatively to the first inertia body 81 and the second inertia body 82.

In the example shown in FIG. 22, a centrifugal element 88 is provided on the intermediate member 87, and the cam mechanism 85 is provided to be actuated with use of a centrifugal force acting on the centrifugal element 88. A configuration applicable to the cam mechanism 85 is similar to that in the aforementioned respective exemplary embodiments.

Figure 23:
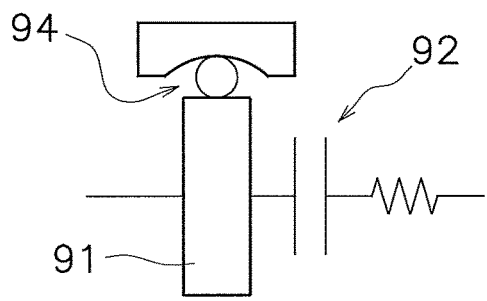
FIG. 23 is a schematic diagram showing application example 8 of the present disclosure.

(8) FIG. 23 is a schematic diagram of a power transmission device that a clutch device is provided on one flywheel. In FIG. 23, a first inertia body 91 includes one flywheel and a clutch cover of a clutch device 92. In this example, a centrifugal element is provided on any of the rotary members composing the first inertia body 91, and a cam mechanism 94 is provided to be actuated with use of a centrifugal force acting on the centrifugal element. A configuration applicable to the cam mechanism 94 is similar to that in the aforementioned respective exemplary embodiments.

Figure 24:
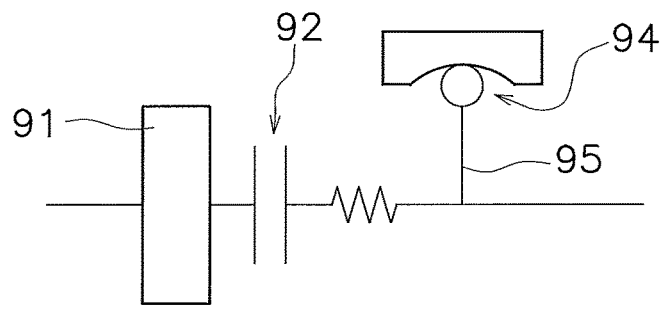
FIG. 24 is a schematic diagram showing application example 9 of the present disclosure.

(9) FIG. 24 shows an example of a power transmission device similar to that in FIG. 23. In this example, a centrifugal element is provided on an output side of the clutch device 92. Additionally, the cam mechanism 94 is provided to be actuated with use of a centrifugal force acting on the centrifugal element 95. A configuration applicable to the cam mechanism 94 is similar to that in the aforementioned respective exemplary embodiments.

(10) The torque fluctuation inhibiting device according to the present disclosure can be disposed on any of the rotary members composing the transmission, and furthermore, can be disposed on an output-side shaft (a propeller shaft or a drive shaft) of the transmission, although these configurations are not shown in the drawings.

(11) As another application example, the torque fluctuation inhibiting device of the present disclosure can be further applied to a heretofore well-known dynamic damper device or a power transmission device provided with a pendulum-type damper device.

INDUSTRIAL APPLICABILITY

According to the present disclosure, in a device for inhibiting torque fluctuations in a rotary member, a peak of torque fluctuations can be reduced in a relatively wide rotational speed range.

REFERENCE SIGNS LIST

1 Torque converter
11 Input-side rotor
12 Output-side rotor
121 First hub
122 Second hub
14 Torque fluctuation inhibiting device
20 Inertia ring (mass body)
201 First inertia ring
202 Second inertia ring
21 Centrifugal element
22 Cam mechanism
221 First cam mechanism
222 Second cam mechanism
23 Coil spring (urging member)
25 Roller (cam follower)
26 Cam
13, 73, 75, 83, 86 Damper
76, 87 Intermediate member
77 Float member
80 Flywheel
81, 82, 91 Inertia body
84, 92 Clutch device

The invention claimed is:

1. A torque fluctuation inhibiting device for inhibiting torque fluctuations in a rotor to which a torque is inputted, the torque fluctuation inhibiting device comprising:
a mass body disposed to be rotatable with the rotor and be rotatable relative to the rotor;
first and second centrifugal elements, each disposed to receive a centrifugal force to be generated by rotation of the rotor and the mass body;
a first cam mechanism configured to convert the centrifugal force that acts on the first centrifugal element into a first circumferential force when a relative displacement is produced between the rotor and the mass body in a rotational direction, the first circumferential force directed to reduce the relative displacement; and
a second cam mechanism configured to convert the centrifugal force that acts on the second centrifugal element into a second circumferential force when the relative displacement is produced between the rotor and the mass body in the rotational direction, the second circumferential force directed to reduce the relative displacement, wherein
the rotor includes a first rotor and a second rotor, the first rotor disposed in a first axial position, the second rotor disposed in a second axial position,
the mass body includes a first inertia ring and a second inertia ring, the first inertia ring disposed on an outer or inner periphery of the first rotor, the second inertia ring disposed on an outer or inner periphery of the second rotor,
the first centrifugal element is supported by the first rotor or the first inertia ring so as to be movable in a radial direction,
the second centrifugal element is supported by the second rotor or the second inertia ring so as to be movable in the radial direction,
the first cam mechanism is disposed in the first axial position in an axial direction, and
the second cam mechanism is disposed in the second axial position in the axial direction.

2. The torque fluctuation inhibiting device according to claim 1, wherein
the rotor includes at least one recess on an outer peripheral surface thereof, and
at least one of the first and second centrifugal elements is accommodated in the at least one recess so as to be movable in the radial direction.

3. The torque fluctuation inhibiting device according to claim 2, wherein a friction coefficient between the at least one recess and the at least one of the first and second centrifugal elements accommodated in the at least one recess is less than or equal to 0.1.

4. The torque fluctuation inhibiting device according to claim 3, wherein a friction reducing member is disposed between the at least one recess and a lateral surface of the at least one of the first and second centrifugal elements accommodated in the at least one recess so as to reduce friction that occurs in movement of the at least one of the first and second centrifugal elements, the lateral surface disposed along a moving direction of the at least one of the first and second centrifugal elements.

5. The torque fluctuation inhibiting device according to claim 2, wherein each of the first and second cam mechanisms includes
- a cam follower provided on each of the first and second centrifugal elements, and
- a cam with which the cam follower makes contact, the cam provided on an inner peripheral surface of the rotor or the mass body, the rotor or the mass body disposed on an outer peripheral side, the cam having a shape for making each of the circumferential forces vary in accordance with an amount of the relative displacement between the rotor and the mass body in the rotational direction.

6. The torque fluctuation inhibiting device according to claim 5, further comprising:
- at least one urging member disposed inside the at least one recess, the at least one urging member configured to urge at least one of the first and second centrifugal elements outward in the radial direction such that at least one corresponding pair of the cam and the cam follower makes contact with each other while the rotor and the mass body are not being rotated.

* * * * *